United States Patent [19]

Nakamura et al.

[11] Patent Number: 4,503,456
[45] Date of Patent: Mar. 5, 1985

[54] AUTOMATIC REGISTRATION ADJUSTING SYSTEM

[75] Inventors: Takashi Nakamura, Atsugi; Kazunori Yamaji, Habano; Taku Kihara, Yokohama, all of Japan

[73] Assignee: Sony Corporation, Tokyo, Japan

[21] Appl. No.: 394,770

[22] Filed: Jul. 2, 1982

[30] Foreign Application Priority Data

Jul. 8, 1981 [JP] Japan .............................. 56-106380

[51] Int. Cl.³ .............................................. H04N 9/09
[52] U.S. Cl. ..................................................... 358/51
[58] Field of Search .................................. 358/51, 68

[56] References Cited

U.S. PATENT DOCUMENTS

| | | | |
|---|---|---|---|
| 2,840,635 | 6/1958 | Burns, Jr. ............................ | 358/68 |
| 4,285,004 | 8/1981 | Morrison et al. ..................... | 358/51 |
| 4,388,641 | 6/1983 | Yamamoto et al. ................... | 358/51 |

Primary Examiner—Richard Murray
Attorney, Agent, or Firm—Lewis H. Eslinger; Alvin Sinderbrand

[57] ABSTRACT

In a micro-processor based automatic registration compensation system for a multi-tube color television camera, the number of correcting points is increased by interpolation of a limited number of sampled error data. The sampling of errors, and generation of respective registration compensating signals therefrom are effected twice in respect to errors in the vertical direction and four times in respect to errors in the horizontal direction for video signals from a red pick-up tube and a blue pick-up tube, respectively, relative to a video signal from a green pick-up tube. The registration compensating signals thus obtained, particularly for the horizontal errors, are desirably applied to auxiliary deflection coils provided on each of the red and blue pick-up tubes.

21 Claims, 61 Drawing Figures

|   | 0 | 1 | 2 | 3 | 4 | 5 | 6 |
|---|---|---|---|---|---|---|---|
| 0 | + | + | + | + | + | + | + |
| 1 | + | + | + | + | + | + | + |
| 2 | + | + | + | + | + | + | + |
| 3 | + | + | + | + | + | + | + |
| 4 | + | + | + | + | + | + | + |
| 5 | + | + | + | + | + | + | + |
| 6 | + | + | + | + | + | + | + |

|   | 0 | 1 | 2 | 3 | 4 | 5 | 6 | 7 |
|---|---|---|---|---|---|---|---|---|
| 0 | 0 | 1 | 2 | 3 | 4 | 5 | 6 | 7 |
| 1 | 8 | 9 | 10 | 11 | 12 | 13 | 14 | 15 |
| 2 | 16 | 17 | 18 | 19 | 20 | 21 | 22 | 23 |
| 3 | 24 | 25 | 26 | 27 | 28 | 29 | 30 | 31 |
| 4 | 32 | 33 | 34 | 35 | 36 | 37 | 38 | 39 |
| 5 | 40 | 41 | 42 | 43 | 44 | 45 | 46 | 47 |
| 6 | 48 | 49 | 50 | 51 | 52 | 53 | 54 | 55 |

FIG. 4

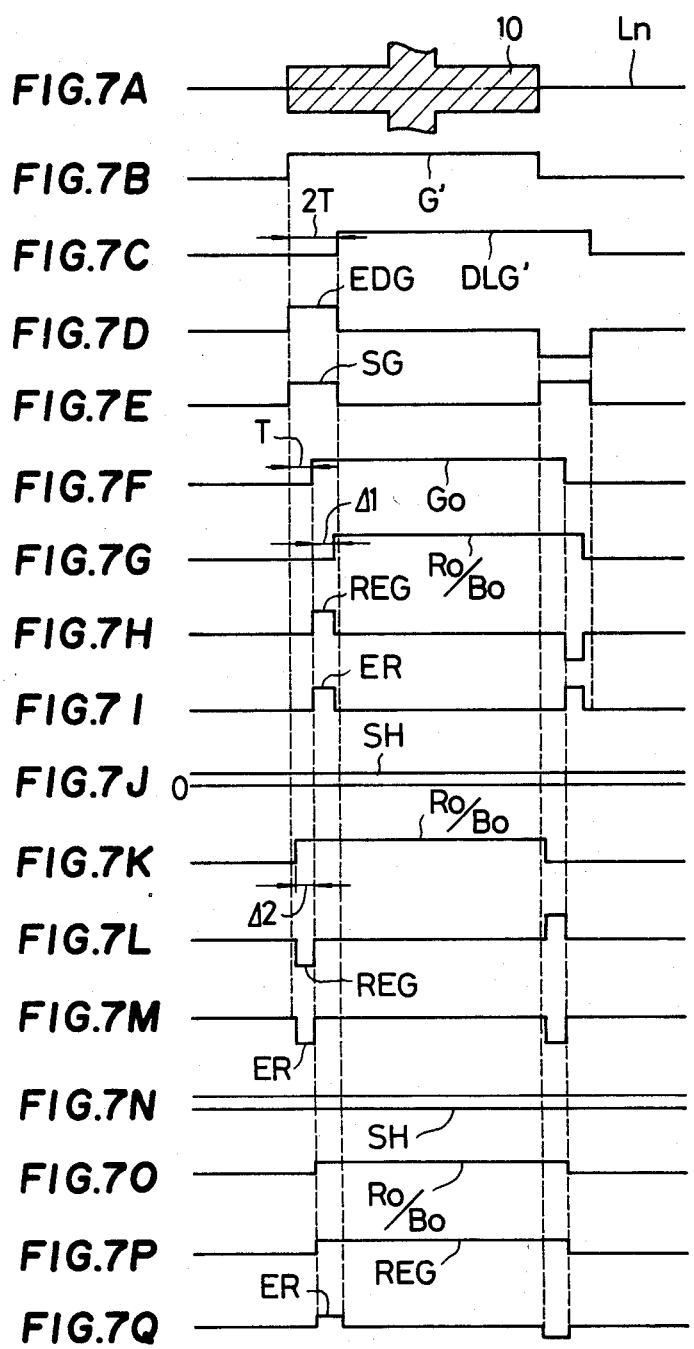

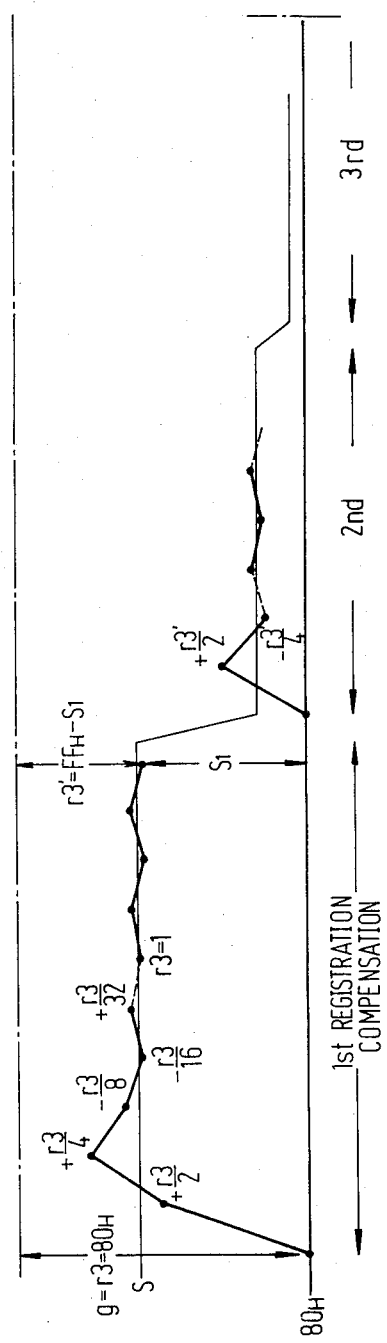

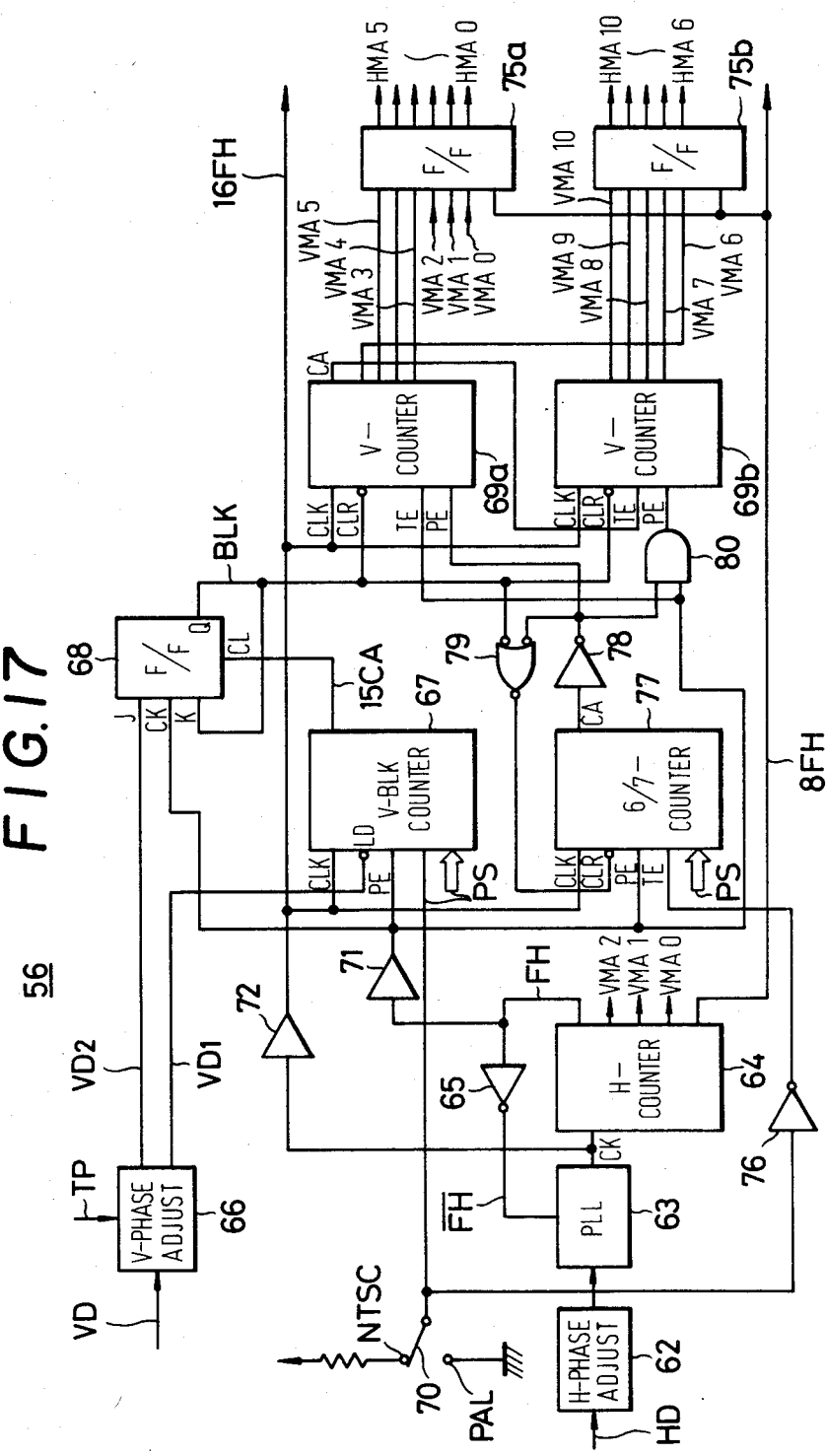

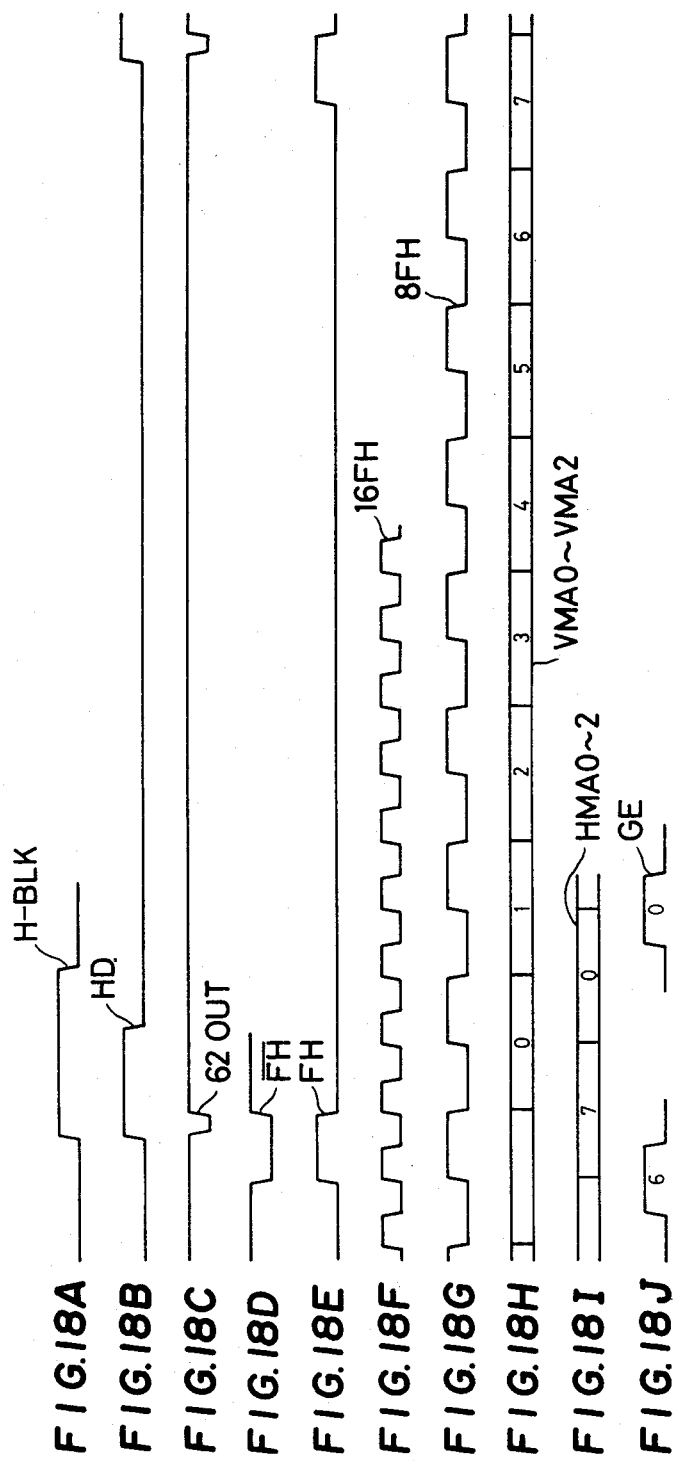

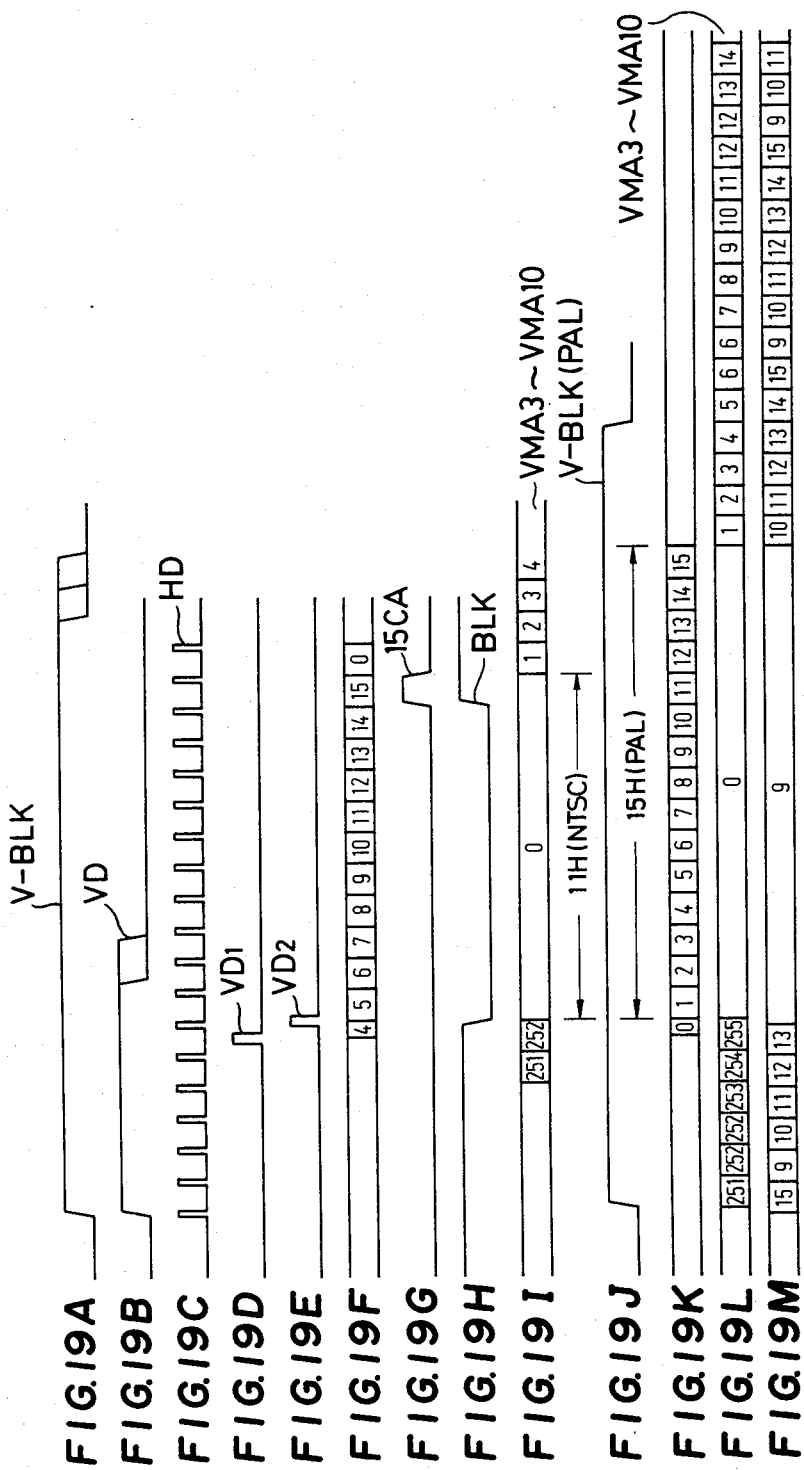

AUTOMATIC REGISTRATION ADJUSTING SYSTEM

BACKGROUND OF THE INVENTION

1. Field of the Invention

The present invention relates to a registration compensation system for a multi-tube color television camera.

2. Description of the Prior Art

In a multi-tube color television camera having a plurality of image pick-up means, for example, of the tri-tube type in which three image pick-up tubes are employed for providing red, green and blue signals, or of the bi-tube type in which two image pick-up tubes are employed for providing luminance and chroma signals, extremely complex controls are necessary for achieving registration of the respective image pick-up tubes. In general, the beam deflecting currents are corrected so as to align the central positions of the output images of the respective image pick-up tubes. However, it is difficult to correct the registration errors which are caused by differences within each image pick-up tube, such as, image rotation (rotation of the image with respect to the axis), distortions (trapezoidal distortion, pincushion distortion or the like) at the periphery of the screen, and errors in image size, scanning linearity, skew distortion and so on. Conventionally, in order to compensate for such registration errors, a complex control circuit generates various control signals to control the beam deflecting currents of the respective image pick-up tubes. Furthermore, since the factors contributing to the registration errors are closely interrelated, registration adjustment at one point on the screen may result in a registration error at another point on the screen. This has made it difficult to achieve uniform registration over the entire area of the screen.

OBJECTS AND SUMMARY OF THE INVENTION

Accordingly, it is an object of this invention to provide a multi-tube color television camera which avoids the foregoing problems of the prior art.

More specifically, it is an object of this invention to provide an automatic registration adjusting system for a multi-tube color television camera which achieves uniform registration over the entire area of the screen.

Another object of this invention is to provide an automatic registration adjusting system, as aforesaid, in which registration error data corresponding to each horizontal scanning line of the entire image area are obtained from a small number of registration error data detected by an even smaller number of sampling operations within a relatively short period of time.

A further object of this invention is to provide an automatic registration adjusting system, as aforesaid, in which extremely precise error data are detected without being affected by frequency characteristics of the beam deflecting system.

Still another object of this invention is to provide a system, as aforesaid, in which registration compensation is achieved through a simplified deflection drive system with reducing amounts of error compensation.

A still further object of this invention is to provide a system, as aforesaid, in which the error detecting operation is accelerated to facilitate convergence of the data to the target.

In accordance with an aspect of this invention, a multi-tube color television camera with an automatic registration compensating or adjusting system comprises a first image pick-up tube for deriving a first video signal of a test chart for registration adjustment, at least a second image pick-up tube for deriving a second video signal of the same test chart, error signal sampling means for sampling registration errors between the first and second video signals with regard to a plurality of segmented image areas, interpolated registration error generating means for generating registration error signals between said sampled registration errors by interpolation with regard to at least the vertical direction of said segmented image areas, means for generating a registration compensating signal based on the generated interpolated registration errors and the sampled registration errors, and means for supplying said registration compensating signal to a deflection control circuit of said second image pick-up tube for eliminating said registration errors between said first and second video signals.

The above, and other objects, advantages and features of the present invention, will become readily apparent from the following detailed description which is to read in connection with the accompanyings drawings forming a part hereof.

BRIEF DESCRIPTION OF THE DRAWINGS

FIG. 4 is a diagram representing memory for storing the registration compensation data prepared by interpolation;

FIGS. 7A–7Q are waveforms to which reference will be made in explaining the operation of the circuit shown on FIG. 5;

FIG. 11 is a graph showing the convergence of the data to a target during detection of error data;

FIG. 17 is a block diagram of an address generator for generating addresses of RAMs included in the circuit of FIGS. 8A and 8B;

FIGS. 18A-18J and FIGS. 19A-19M are timing charts to which reference will be made in explaining the operation of the address generator of FIG. 17;

DETAILED DESCRIPTION OF THE PREFERRED EMBODIMENTS

Figures 1, 2, 3:
FIG. 1 is a diagramatic plan view of a segmented image areas to which reference will be made in explaining a registration compensation system according to an embodiment of the present invention.
FIG. 2 is a diagram showing memory areas for storing error data in respect to each of the segmented image areas of FIG. 1.
FIG. 3 is a diagram to which reference will be made in explaining interpolation of data stored in vertically adjacent areas of the memory shown in FIG. 2.

An automatic registration system according to an embodiment of the present invention will be described in general with reference to FIG. 1 in which the image area of a tri-tube type color television camera is shown divided by 7 in both the horizontal and the vertical directions to provide a total of 49 segmented image areas. In the following, it will be assumed that registration of the red signal from the red tube and of the blue signal from the blue tube is to be performed with reference to the image pick-up tube for providing the green signal. During such registration, a test chart with a cross mark "+" at the center of each segmented area, as shown on FIG. 1, is reproduced. It is also possible to incorporate within the television camera a slide film having the test chart pattern of FIG. 1, and to insert this slide film in the optical path of the image pick-up tubes when registration is to be effected.

For each segmented image area, registration error data representing V-errors (registration errors in the vertical direction) and H-errors (registration errors in the horizontal direction) of the red and blue tubes are detected with reference to the green tube in a manner to be described later. The registration error data is converted into digital data and is temporarily stored in a respective element of memory area indicated in FIG. 2. This memory area has matrix addresses of 7 rows and 8 columns. Each memory element thus defined stores the registration error data representing the H- and V-errors for a respective segmented image area. The last column of elements of the memory area shown in FIG. 2, which is headed by the numeral "7", does not correspond to any of the segmented image areas (7×7) of the image area and is used to store registration error data of the H- and V-errors during the horizontal blanking interval H-BLK. The registration error data for the horizontal blanking interval may be a mean value of the initial and final data which has been sampled. For example, the mean value of data D8 and data D14 may be calculated to provide data D15 stored in memory element identified at "15". By this insertion of registration error data for the horizontal blanking interval, smoother correction of the horizontal and vertical deflecting currents is achieved.

It is also possible to incorporate a memory for storing mean value data for the vertical blanking interval as well as for the horizontal blanking interval.

Sampled data respectively stored in the vertically adjacent elements of the memory area shown in FIG. 2 are interpolated to obtain error data for each scanning line by digital approximation. As for the sampled data stored in the elements of the memory area which are adjacent each other in the horizontal direction, interpolation may be performed by analog signal processing by means of a low-pass filter, and thus such interpolation does not require digital signal processing in this embodiment.

When the number of segments into which the image area is divided for extracting registration error data is too small, it is difficult to achieve precise correction of registration errors. On the other hand, when the number of the segmented image areas is too large detection and processing of the registration error data are time consuming. In the embodiment of the present invention being presently described, the image area is divided into 7×7 matrix of segmented image areas. Therefore, in the case of the NTSC system, thirty-six lines are assigned to each segmented image area in the vertical direction. Thereafter, as indicated in FIG. 3, thirty-five pieces of interpolation data I1 to I35 are linearly approximated between vertically adjacent pieces of sampled data (for example, D16 and D24). In such case, the detected registration error data may be considered to correspond to errors at the centers of the segmented image areas. Although interpolation of the H-and V-errors is performed for all the sampled data pieces in the vertical direction, the time required for the interpolation calculation is very much shorter than the time required for registration error detection. For this reason, in accordance with this invention, registration error data is obtained with high precision and within a short period of time by means of a relatively smaller number of sampling operations.

In this manner, the registration error data respectively corresponding to all of the scanning lines of an entire image area are prepared by interpolation in the vertical direction. The registration error data is then temporarily stored in a memory area having the matrix addresses shown in FIG. 4. This memory for storing compensating data has 256 rows and 8 columns of matrix addresses (8×256 matrix). Each memory address stores the two pieces of error data for the V- and H-errors, respectively.

Thereafter, the registration compensating data stored in the memory area is read out in synchronism with a scanning signal and is converted into an analog correction signal. Horizontal and vertical deflecting currents are controlled according to the correction signal thus obtained. As a result, correction of the image size of each image pick-up tube, the deflection linearity and the skew distortion, and correction of the trapezoidal distortion, pincushion distortion or the like may be simultaneously achieved during registration compensation. It will be seen that the foregoing generally described procedure makes it possible to achieve automatic detection and compensation of the registration errors with ease.

Figure 5:
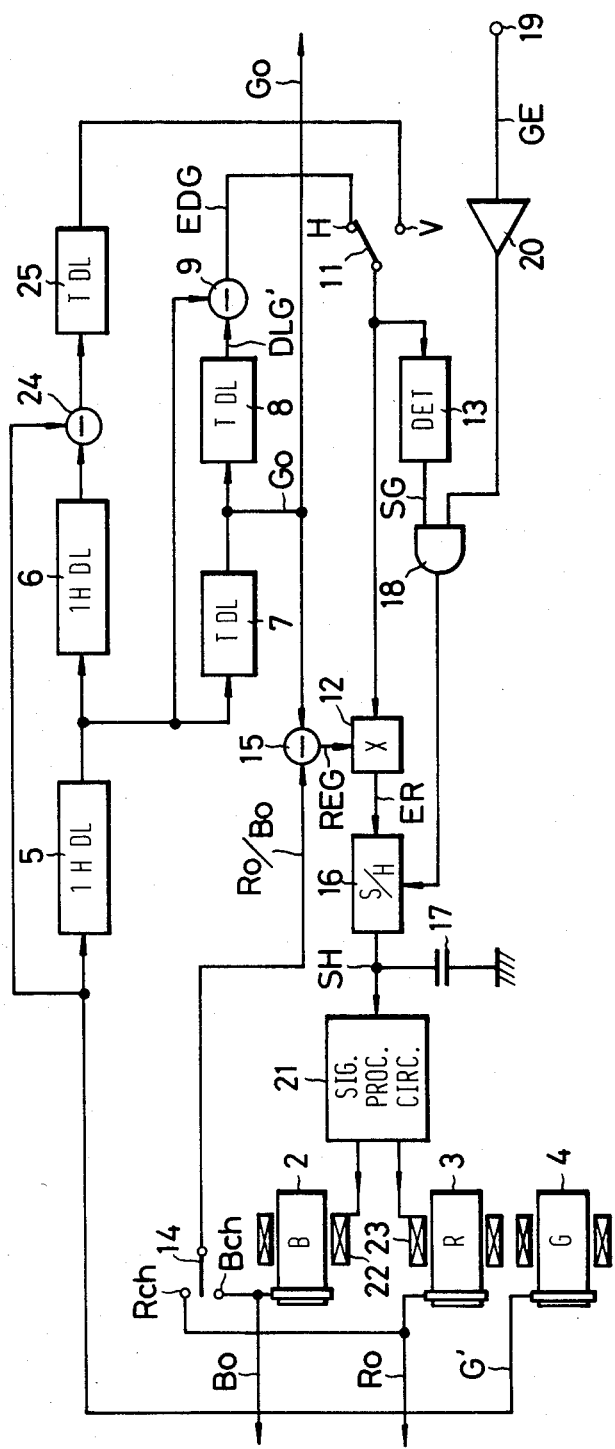
FIG. 5 is a block diagram showing an example of a detection circuit for obtaining error data in respect to the horizontal and vertical directions.

Referring now to FIG. 5, it will be seen that a television camera in which automatic registration adjustment is to be effected according to an embodiment of the present invention has three image pick-up tubes 2, 3 and 4 for providing color signals corresponding to the blue, red and green components of the image being viewed. The deflection system of the camera is adjusted in advance so that the phase of an output G' from the green tube 4, used as a reference for registration compensation, may be advanced relative to the phases of the outputs from the red tube 3 and the blue tube 2 by (H+T) (where H is the horizontal scanning period and T is about 150 ns).

Referring to FIG. 7A, it will be seen that an image 10 of a cross mark in one of the segmented image areas of the test chart of FIG. 1 is there illustrated, and the corresponding output from the green tube 4 at a horizontal scanning line Ln will have the waveform shown in FIG. 7B. The output G' from green tube 4 is delayed by (H+T) through a 1H delay line 5 and a T delay line 7 to provide, at the output of the latter, a main signal $G_0$ (FIG. 7F). When no registration error is detected, main signal $G_0$ (FIG. 7F) is in phase, in the horizontal and vertical directions, with outputs $R_0$ and $B_0$ (FIG. 7O) from the image pick-up tubes 3 and 2.

The output from the T delay line 7 is further delayed by a T delay line 8, and the resulting delayed output DLG' (FIG. 7C) is supplied to a subtractor 9 to be subtracted from the other input thereto which is the output from the 1H delay line 5. An edge signal EDG representing the horizontal edge of the image 10 is generated as the output of subtractor 9, as shown in FIG. 7D. This edge signal EDG has positive polarity at the leading edge of the video signal and negative polarity at the trailing edge of the video signal. The edge signal EDG is supplied through a contact H of a change-over switch 11 to a multiplier 12 as well as to an edge detector 13. The edge detector 13 generates a sampling gate signal SG (FIG. 7E) corresponding to the timing of the edge signal (FIG. 7D).

A selection switch 14 selects the output $R_0$ or $B_0$ from the red tube 3 or the blue tube 2, respectively, and supplies the selected output $R_0/B_0$ (FIG. 7G) to a subtractor 15. The subtractor 15 obtains the difference between such signal $R_0/B_0$ (FIG. 7G) and the main signal $G_0$ (FIG. 7F). An output signal REG (FIG. 7H) from subtractor 15 is a position error signal representing the phase lead $\Delta_1$ of the output signal from the red tube or the blue tube with respect to the output signal from the green tube, and which corresponds to the horizontal error. This position error signal REG is supplied to another input of multiplier 12 and is multiplied in the latter by edge signal EDG. The multiplication result from multiplier 12 is an error signal ER (FIG. 7I) representing the magnitude and direction of the horizontal registration error, and is supplied to a sample and hold circuit 16. The sample and hold circuit 16 samples the error signal ER for the duration of the sampling gate signal SG (FIG. 7E) and produces a dc sample and hold voltage SH (FIG. 7J) corresponding to the level and polarity of error signal ER. A capacitor 17 connected to the output of sample and hold circuit 16 acts as a hold capacitor.

The sampling gate signal SG is supplied to sample and hold circuit 16 through an AND gate 18. The AND gate 18 is opened by a sampling gate pulse GE supplied thereto from a terminal 19 through a buffer 20. The sampling gate signal GE is generated in correspondence with each of the segmented image areas shown in FIG. 1.

If the phases of the outputs $R_0$ and $B_0$ from red tube 3 and blue tube 2 are delayed relative to the phase of the main signal $G_0$ from green tube 4 by $\Delta_1$, as shown in FIG. 7G, the sample and hold voltage SH shown in FIG. 7J has positive polarity and a level corresponding to $\Delta_1$. On the other hand, if the outputs from the red and blue tubes lead the main signal by $\Delta_2$, as shown in FIG. 7K, the polarity of position error signal REG (FIG. 7L) is opposite to that shown in FIG. 7H. Therefore, the respective error signal ER representing the magnitude and direction of registration error has negative polarity, as shown in FIG. 7M, and the resulting negative sample and hold voltage SH has a level corresponding to $\Delta_2$ as shown in FIG. 7N.

The output signal from sample and hold circuit 16 is supplied as the registration error data, to a signal processing circuit 21 which, as hereinafter described, prepares compensating data. In accordance with the compensating data thus prepared, beam deflectors 22 and 23 for the corresponding blue tube 2 and the red tube 3 are controlled. As a result of this control operation, the outputs $R_0/B_0$ from the red and blue tubes are brought into phase with the main signal $G_0$ from the green tube 4, as shown in FIG. 7O. Since the level of the output signal from the green tube 4 is not equal to that of the output signal from the red or blue tube 3 or 2, the level of the position error signal REG may not become zero as shown in FIG. 7P even if the images from all the tubes are registered properly. However, since the error signal ER from multiplier 12 alternately takes opposite polarities at the leading and trailing edges of the video signal, as shown in FIG. 7Q, the level of the sample and hold signal SH becomes zero.

Figure 6:
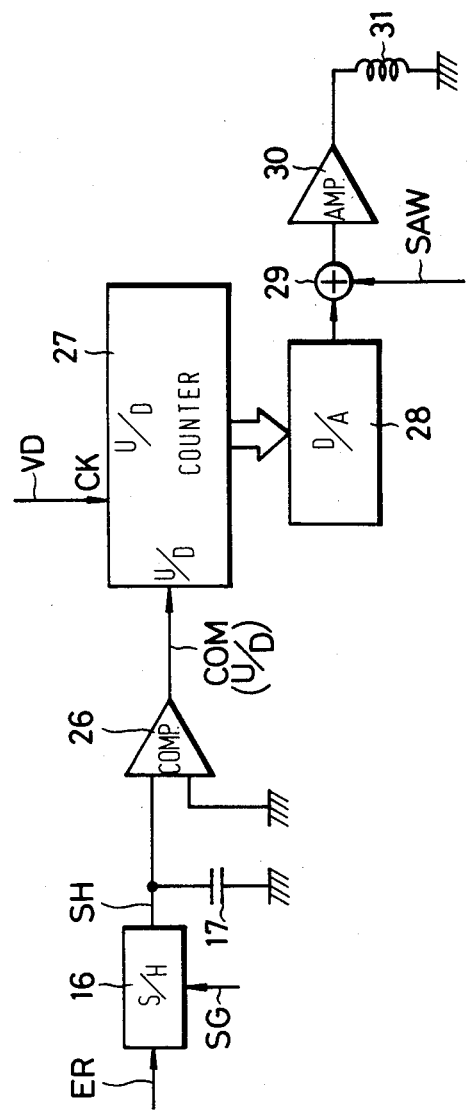
FIG. 6 is a block diagram showing an example of a circuit for effecting registration compensation and which may be included in the circuit of FIG. 5.

As shown on FIG. 6, the part of the signal processing circuit which provides compensating data generally comprises a comparator 26, U/D up-down counter 27, and a D/A converter 28. The sample and hold voltage SH from sample and hold circuit 16 is supplied to comparator 26 in which the sample and hold voltage SH is compared with ground potential (0 V) to thereby detect the polarity of the registration error data which represents whether the output image from the red or blue tube is to the right or to the left of the output image from the green tube. A comparison signal COM from comparator 26, which goes high or low level in correspondence with the polarity of the registration error data, is supplied to an input U/D of up-down counter 27. In response to each vertical sync signal VD supplied as a clock pulse CK to up-down counter 27, the latter counts up or down in accordance with a high or low level, respectively, of the comparison signal COM from comparator 26. In actual practice and as hereinafter described in detail, up-down counter 27 does not change count data in units of 1 bit at every vertical scanning period.

The output signal from up-down counter 27 is supplied to D/A converter 28 in which it is converted into a control voltage. Such control voltage is then supplied, as a dc bias voltage, to an adder 29 to be added to a sawtooth wave signal SAW suitably provided for causing deflection of the electron beam in the respective image pick-up tube. The output signal from adder 29 is supplied to a drive amplifier 30 which provides a deflecting current flow to a deflecting coil 31 of the red tube 3 or of the blue tube 2 connected to the output of drive amplifier 30.

If the sample and hold voltage SH provided as the registration error data output from sample and hold circuit 16 is of positive polarity, the comparison signal COM from comparator 26 goes to a high level, and the count value of up-down counter 27 is decremented. In response thereto, the deflecting current flowing to deflection coil 31 is reduced, and the horizontal scanning position of the red tube or the blue tube is shifted to the left to minimize the error of the image output therefrom with respect to the image output from the green tube. On the other hand, if the sample and hold voltage SH is of negative polarity, the count value of up-down counter 27 is incremented, and the horizontal scanning position of the red tube or the blue tube is shifted to the right. Therefore, the output image from the red tube or the blue tube which has been shifted to the left with respect to the output image from the green tube is shifted to the right to minimize the registration error.

By repetitively detecting the registration error and correspondingly correcting the deflecting current in accordance with the detection result, the registration error of the output images from the respective image pick-up tubes is gradually eliminated and horizontal registration is automatically achieved. The up-counting or down-counting operation of counter 27 is interrupted upon convergence of the registration error to a target value.

Automatic vertical registration adjustment is similarly performed. The image edge signal for vertical registration adjustment is produced by obtaining, through a subtractor 24 (FIG. 5), the difference between the output G' from green tube 4 and the signal obtained by delaying the output G' by 2H throuh 1H delay lines 5 and 6. The edge signal output from subtractor 24 is supplied to multiplier 12 through a contact V of changeover switch 11 via a T delay line 25 for the purpose of keeping the output signals from the red and blue tubes in phase with main signal $G_0$ from green tube 4. The operation of detecting the V-error by the circuit including multiplier 12 is basically the same as has been described for detecting the H-error.

Registration compensation on the basis of the detection of registration error data representing the H-and V-errors is effected for both red tube 3 and blue tube 2 and for each of the forty-nine segmented image areas of the test chart of FIG. 1. The registration error data obtained for each segmented image area is temporarily stored in the respective memory area represented diagramatically in FIG. 2. The registration error data thus stored in the memory of FIG. 2 are interpolated in the vertical direction and the resulting interpolated data are written in respective elements of the memory represented diagramatically in FIG. 4.

Figure 8A:
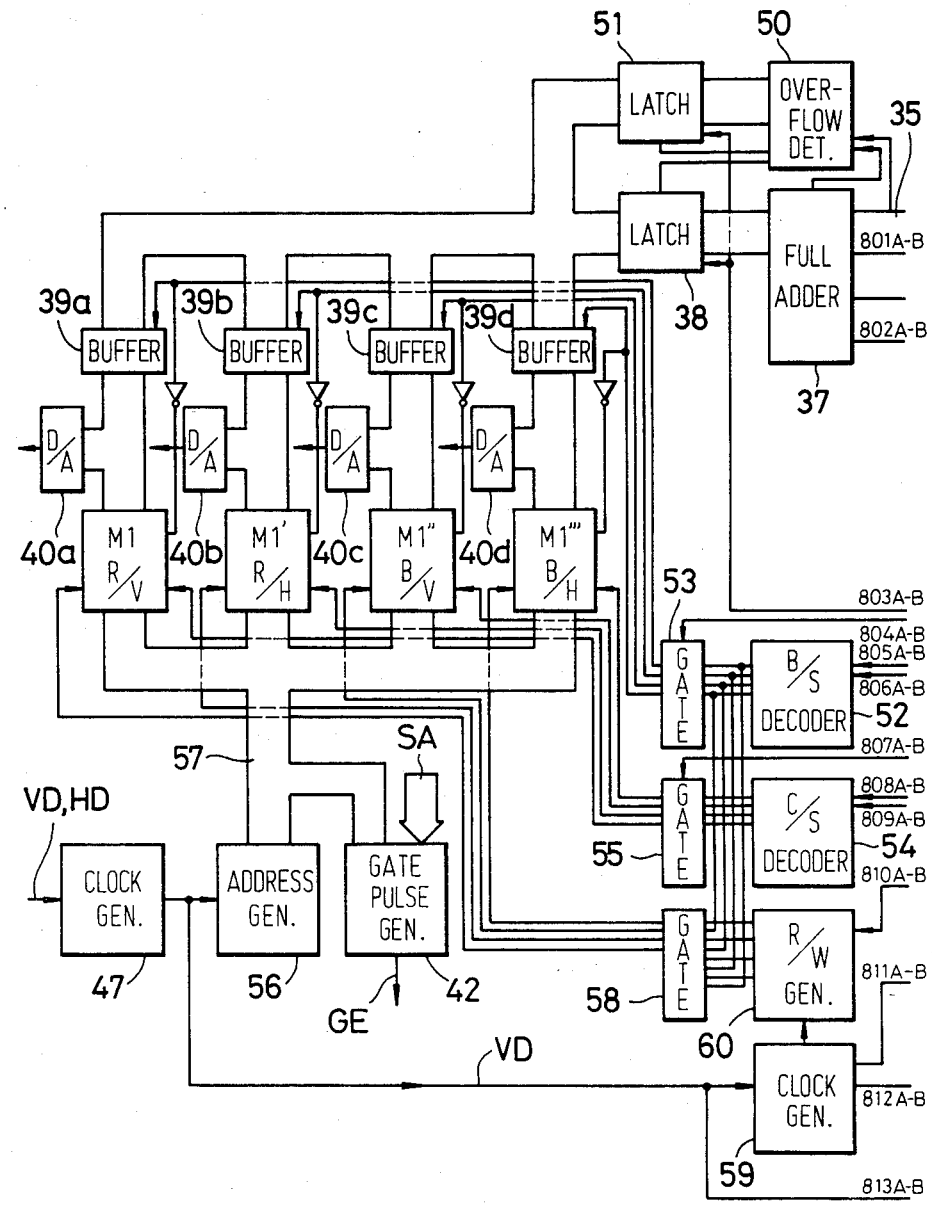
FIGS. 8A and 8B together form a block diagram of a control circuit according to an embodiment of this invention for controlling detection, storage, interpolation and registration compensation of error date in the vertical and horizontal directions.
Figure 8B:
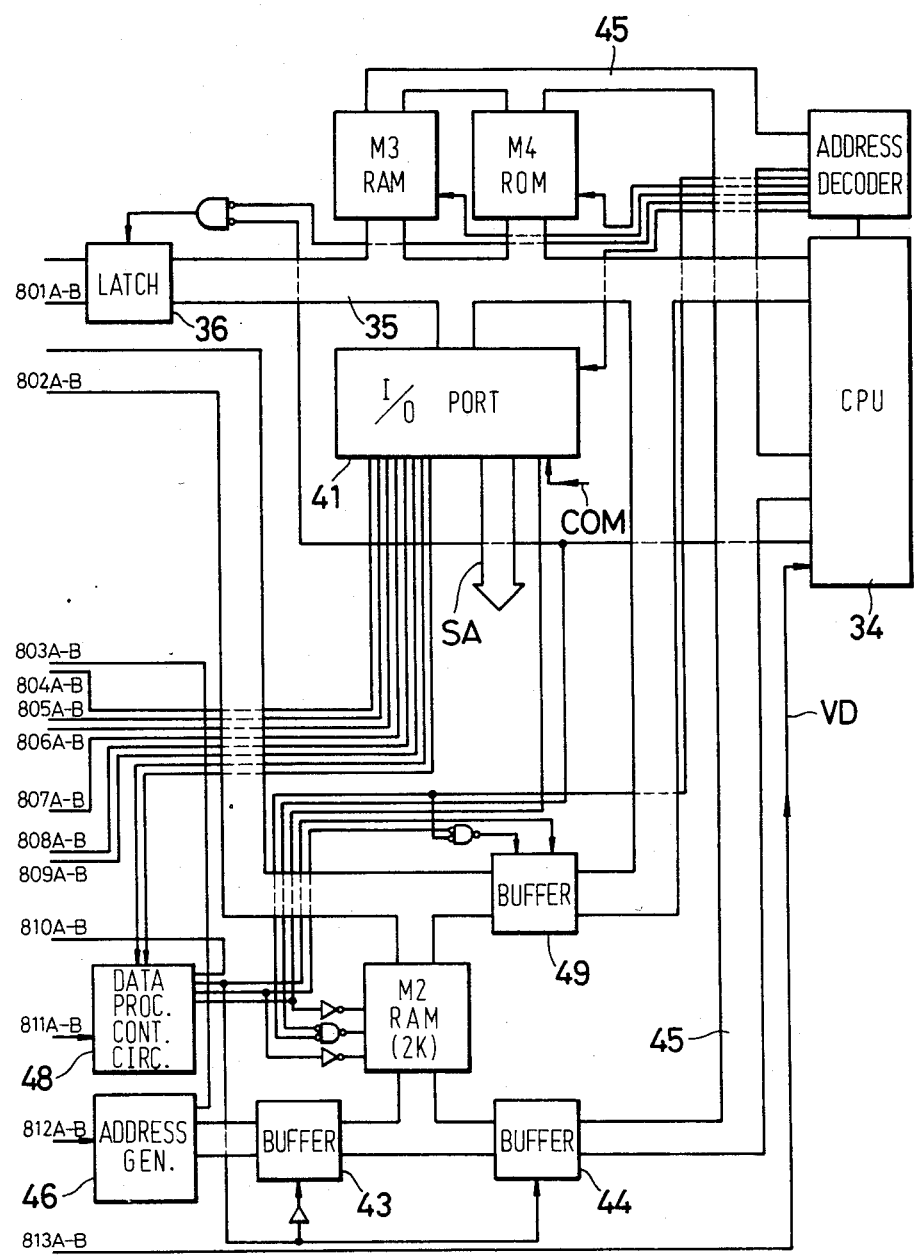

FIGS. 8A and 8B, taken together, show a block diagram of the signal processing circuit 21 for performing a series of data processing operations according to an embodiment of the present invention. The signal processing circuit 21 is shown in FIG. 8B to mainly include CPU (central processing unit) comprising a microcomputer and memories (ROM and RAM).

Referring to FIGS. 8A and 8B, it will be appreciated that an arithmetic and logic unit and registers of CPU 34 together with a program stored therein constitute a counter corresponding to up-down counter 27 shown in FIG. 6. The count value from this counter is supplied to the beam deflector 22 or 23 of blue tube 2 or red tube 3 through the associated one of buffers 39a, 39b, 39c and 39d, and the associated one of D/A converters 40a, 40b, 40c and 40d (FIG. 8A) via a data bus 35 (FIG. 8B), a latch circuit 36, a full adder 37, and a latch circuit 38 (FIG. 8A). The comparison signal COM from the comparator 26 shown in FIG. 6 is supplied to CPU 34 through an input/output port (I/O port) 41. The count value of the counter in CPU 34 is incremented or decremented in accordance with the polarity or the level of the comparison signal COM. The vertical sync signal VD used in the television camera may be supplied as the clock pulse to the counter in CPU 34, and may be provided by a clock generator 47 (FIG. 8A).

In the same manner as has been described above with reference to FIG. 6, the deflecting current is changed by incrementing or decrementing the count value of the counter in CPU 34. After the first cycle of registration compensation, the registration error is detected again by the detection circuit shown in FIG. 5. By repetition of the operations described above, the registration errors of the images from the respective image pick-up tubes are gradually eliminated, and the registration error data is obtained from the counter in CPU 34 with a predetermined convergence state. This registration error data is stored in corresponding addresses of a random access memory (RAM) M3 (FIG. 8B).

The RAM M3 has a 7×8 address matrix as shown in FIG. 2. The registration error data for each segmented image area shown in FIG. 1 is written at the respective address of RAM M3. A control address for RAM M3 is supplied from an address decoder of CPU 34 through an address bus 45. A gate pulse GE for designating each segmented image area shown in FIG. 1 is generated by a gate pulse generator 42 (FIG. 8A) and is supplied to AND gate 18 through terminal 19 shown in FIG. 5.

Figure 4:
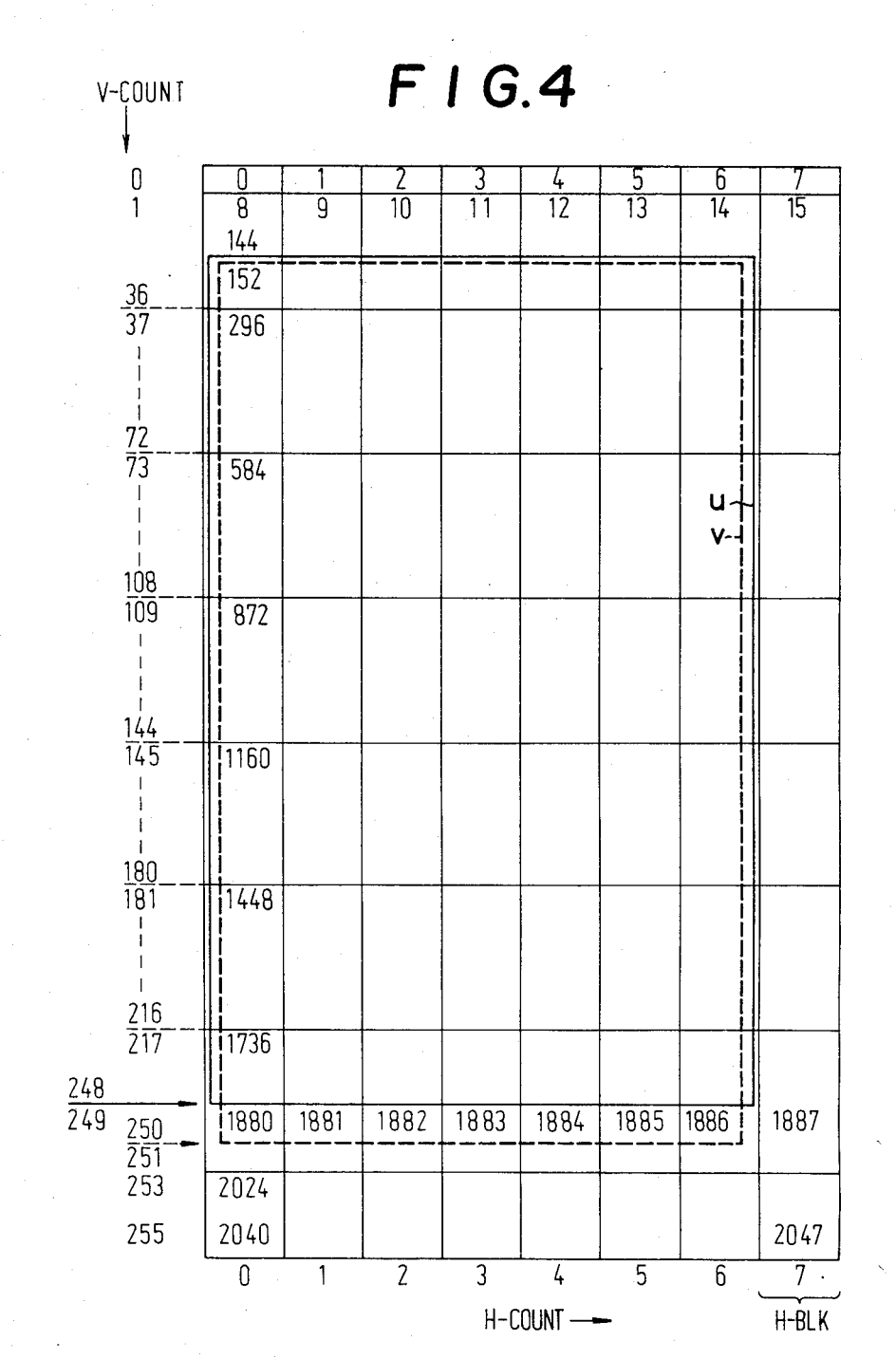

Upon completion of the detection of the registration error for one of the four channels, that is, vertical error in the blue tube, horizontal error in the blue tube, vertical error in the red tube and horizontal error in the red tube, respectively, the registration error data stored in RAM M3 is sequentially supplied to CPU 34 through data bus 35. The CPU 34 performs interpolation of the received registration error data in the vertical direction. A basic program for interpolation and a system program for control of the overall system are written in a read-only memory (ROM) M4 (FIG. 8B). Part of RAM M3 is used as a working register. The interpolated data is written through data bus 35 in a random access memory (RAM) M2 having a memory area as shown in FIG. 4. Preset data, for example, the data 80H (hexadecimal notation), is written at all addresses of RAM M2 upon starting the compensating operation. This preset data at each address is replaced by the respective interpolated data and, during this rewriting in RAM M2, control addresses are supplied to RAM M2 from CPU 34 through a buffer 44 which is then ON.

After completion of the interpolation, the registration error data stored at respective addresses in RAM M2 are read out therefrom in synchronism with scanning operation of the image pick-up tubes 2, 3 and 4. The registration error data is then supplied to the beam deflector of corresponding image pick-up tube 2 or 3 through the associated one of the buffers 39a, 39b, 39c and 39d and the associated one of the D/A converters 40a, 40b, 40c and 40d by way of full adder 37 and latch circuit 38. During this operation, a buffer 43 is turned ON, and the control addresses for RAM M2 are supplied through buffer 43 from an address generator 46. In accordance with the data stored at each address of RAM M2, there is obtained an image output which has been subjected to coarse registration compensation. A second registration compensation operation is then performed on the basis of this coarsely corrected image output. Readout of the data from RAM M2 and the writing of data in RAM M2 are performed under the control of the output of a data processing control circuit 48 (FIG. 8B).

Data required for the second registration compensation operation is supplied to full adder 37 from the counter of the CPU 34 through data bus 35 and latch circuit 36. Full adder 37 adds the second registration compensation data to the first registration compensation data in RAM M2. The result of such addition is converted through the associated buffer 39a, 39b, 39c or 39d and D/A converter 40a, 40b, 40c or 40d, into analog data which is supplied to the deflector of the corresponding image pick-up tube 2 or 3. The second registration compensation data which is detected through up-counting/down-counting operation of the counter in CPU 34, as in the case of the first registration compensation data, is stored at the corresponding addresses of RAM M3. Such second registration compensation data is a fine compensation component as compared with the coarse compensation component represented by the first registration compensation data.

Upon completion of the second registration compensation operation for each segmented image area shown in FIG. 1, data stored in RAMs M2 and M3 are again synthesized by CPU 34 and stored in RAM M3. Then, the data stored in RAM M3 is interpolated in the vertical direction by CPU 34, and the interpolated data is stored in RAM M2.

The above described registration compensation is performed twice for the vertical errors of the red and blue tubes 3 and 2, respectively, and four times for the horizontal errors of such tubes. In the absence of such repeated compensation operations, complete elimination of registration errors could not be reliably expected. More particularly, each of the segmented image areas of FIG. 1 may be regarded as being at the center of the screen, and a dc deflecting bias current is supplied for each segmented image area for detecting the respective static error data. In other words, the registration error data is detected under static conditions. Thereafter, if such registration error data obtained under static conditions is read out in synchronism with the beam scanning operation in the respective image pick-up tube and is supplied to the deflector of such tube, the frequency or dynamic characteristics of the deflector may cause less than complete elimination of the registration error. However, in accordance with the present invention, the registration error that occurs by reason of the deflectors' dynamic characteristics is eliminated in the repeated compensation operations so as to reduce the registration error to zero.

If the error data obtained by the first registration compensation operation is read out in synchronism with beam scanning and is supplied to the deflector as an error signal, this error signal is a high-frequency signal having a frequency at least four times the horizontal scanning frequency. Such a high-frequency signal would likely cause distortion due to the frequency characteristics attributable to the inductance of the beam deflecting system of the image pick-up tube. However, in the case of detection of the error data in accordance with the present invention, a dc signal determined according to the count value of the counter within CPU 34 is supplied as an error signal to each deflector. This error signal is not subject to the influence of the frequency characteristics of the deflecting system so that extremely precise error data is obtained.

In the second registration compensation operation and thereafter, the addition, in full adder 37 (FIG. 8A), of the first error data read out from RAM M2 to the second error data from CPU 34 may cause an overflow. For this reason, a carry output from full adder 37 is detected by an overflow detector 50. When an overflow of full adder 37 is detected, predetermined bias data is supplied to the data bus from overflow detector 50 through a latch circuit 51 to reset the overflow condition.

The error data which has been detected and interpolated and is stored in RAM M2 is transferred to each of RAMs M1, M1', M1'', and M1''' through full adder 37, latch circuit 38, and the associated one of buffers 39a, 39b, 39c and 39d. Each of these RAMs M1 to M1''' has the same capacity as RAM M2. RAM M1 is assigned to the R/V channel, that is, the vertical channel of red tube 3; RAM M1' is assigned to the R/H channel, that is, the horizontal channel of red tube 3; RAM M1'' is assigned to the B/V channel, that is, the vertical channel of blue tube 2; and RAM M1''' is assigned to the B/H channel, that is, the horizontal channel of blue tube 2. The buffers 39a, 39b, 39c and 39d associated with the channels R/V, R/H, B/V and B/H, respectively, are selectively actuated by a control signal supplied from a buffer selection decoder (hereinafter referred to as a B/S decoder) 52 through a gate 53 (FIG. 8A). The RAMs M1 to M1''' are selected by a control signal supplied from a chip selection decoder (hereinafter referred to as a C/S decoder) 54 through a gate 55. These decoders 52 and 54 operate in response to a control signal supplied from CPU 4 through I/O port 41 (FIG. 8B).

Data stored in RAMs M1 to M1''' are read out in synchronism with the deflection of the electron beam in the respective image pick-up tube in response to an address signal supplied from an address generator 56 through an address bus 57. The data is supplied to the deflectors of yokes 22 and 23 of the red and blue tubes 3 and 2 through the corresponding D/A converters 40a to 40d, respectively. As a consequence, registration compensation of the vertical and horizontal errors for each of red tube 3 and blue tube 2 is performed, and a video output free from registration error is obtained from the television camera. Readout and write operations of the data from and in RAMs M1 to M1''' are performed in accordance with a read/write control signal supplied from a R/W (read-write) control signal generator 60 through a gate 58. Generator 60 operates to produce the read/write control signal in response to a clock generated by a clock generator 59 and the control signal output from signal processing circuit 48.

Figure 9:
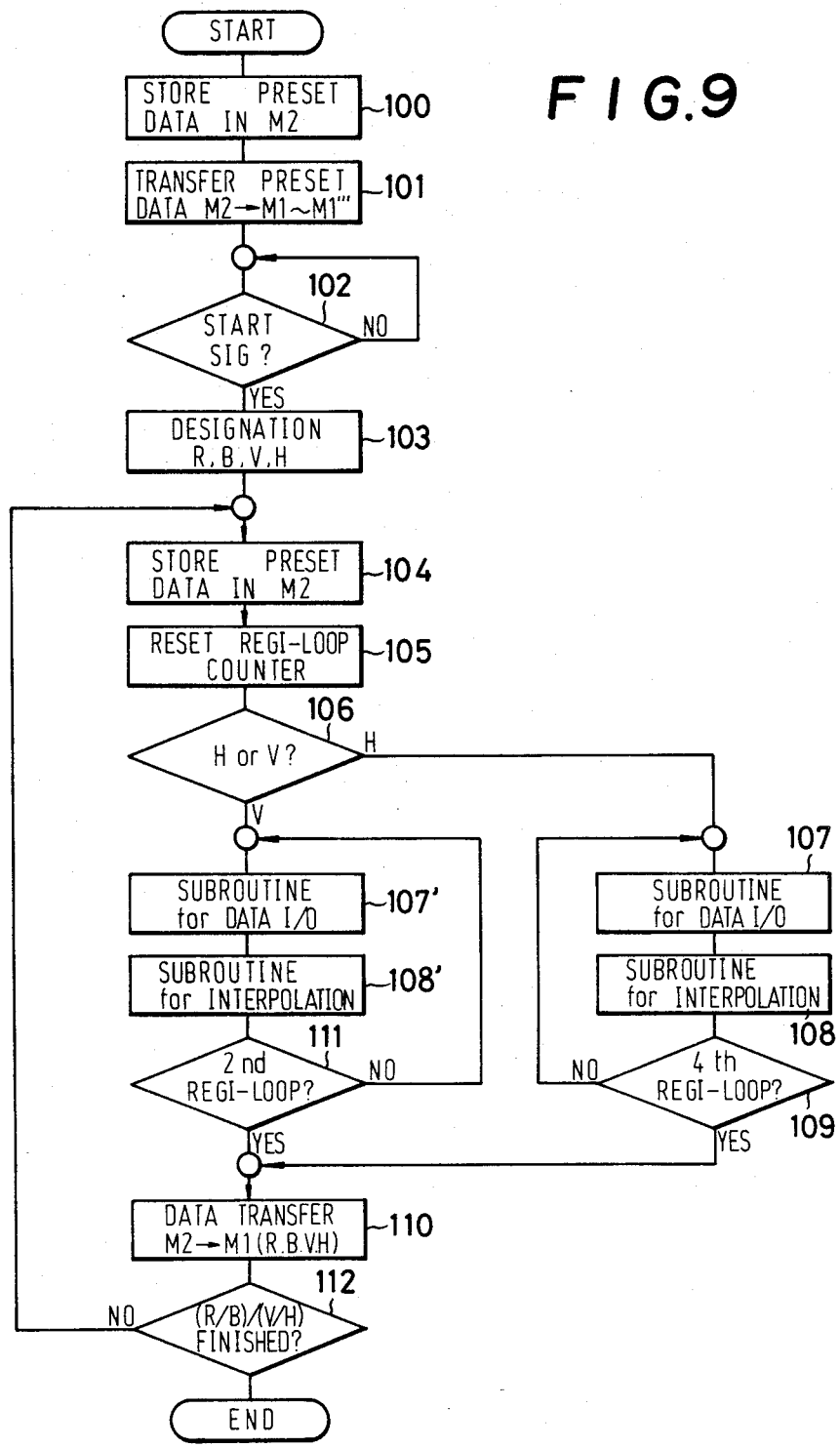
FIG. 9 is a flowchart for the registration compensation operation of the circuit shown in FIGS. 8A and 8B.

Referring now to FIG. 9, which shows a flow chart of the above-described registration compensation operation, it will be appreciated that such operation is initiated by depression of a compensation start button (not shown) of the television camera. In the resulting first step 100, preset data which may be, for example, 80H (hexadecimal notation), is written in RAM M2. In step 101, the preset data stored in RAM M2 is transferred to RAMs M1 to M1'''. When this preset data is supplied to RAMs M1 to M1''', the output from each of the respective D/A converters 40a to 40d is zero, and the amount of correction of the beam deflecting current for each image pick-up tube is zero.

In step 102, it is discriminated or decided if a start signal is available. This start signal may be suitably generated upon completion of the operation of the automatic centering circuit for aligning the centers of the image areas of the red and blue tubes with reference to the green tube. This automatic centering circuit may have the configuration described above with reference to FIGS. 5 and 6. The automatic centering circuit is incorporated for the purpose of aligning the centers of the images of the respective image pick-up tubes prior to registration compensation and for minimizing the amount of registration compensation that is required. If the centering is manually performed, the start signal discriminated in step 102 may be generated by depression of a start button after completion of the manual centering.

In step 103, one channel is selected from among the several channels (R/V, R/H, B/V, and B/H). In step 104, the preset data is again written in RAM M2 as the preset data is written in RAM M2 every time the data stored in the RAM M2 is reset prior to registration compensation for each of the channels. This preset data, for example, 80H (hexadecimal notation), corresponds to no registration compensation. In response to this presetting operation, the data stored in RAM M2 during a preceding registration compensation operation is deleted. In step 105, the counter (REGI loop counter) for counting the number of registration compensation operations that have been performed is preset to "0".

In step 106, it is decided or discriminated whether the channel (R/V, R/H, B/V or B/H) selected or designated in step 103 is a horizontal channel (R/H or B/H) or a vertical channel (R/V or B/V). If the selected channel is horizontal, a data I/O subroutine 107 for loading registration error data in RAM M3 is executed. When this subroutine 107 is completed, a subroutine 108 is performed for interpolating, in the vertical direction, the horizontal error data loaded in RAM M3. When subroutine 108 is completed, the count value of the REGI counter is incremented by one, and then it is discriminated or decided if the resulting count value is "4". If the count value is not "4", the flow returns to subroutine 107. Thus, subroutine 107 is repeated up to four times and first to fourth registration compensation operations are performed. When the fourth loop is completed, the resulting data stored in RAM M2 is transferred in step 110 to the one of RAMs M1 to M1''' (which corresponds to the channel R/V, R/H, B/V or B/H) previously selected in step 103.

On the other hand, if the selected channel is discriminated, in step 106, to be a vertical channel R/V or B/V, a data I/O subroutine 107' and an interpolating subroutine 108' are performed in succession. In step 111, it is discriminated or decided if the REGI loop comprised of subroutines 107' and 108' has been performed twice. As for the compensation of the vertical errors, since the unit of the picture element in the vertical direction of the image is the horizontal scanning line, and the vertical scanning rate is very much less than the horizontal scanning rate of the electron beam in each image pick-up tube, so that the compensation for vertical errors is less influenced by dynamic characteristics of the deflectors, a substantially satisfactory compensation result may be obtained in respect to the vertical registration errors by performing the respective compensation operation only twice.

After the data stored in RAM M2 is loaded in one of RAMs M1 to M1''' in step 110, it is discriminated in step 112 if compensation for all four channels R/V, R/H, B/V and B/H has been performed. If NO, the flow returns to step 104 and a compensation operation is performed for each of the remaining channels as selected in order in step 103. If the decision in step 112 is YES, compensation operations by the circuit shown on FIGS. 8A and 8B are terminated.

Figure 10A:
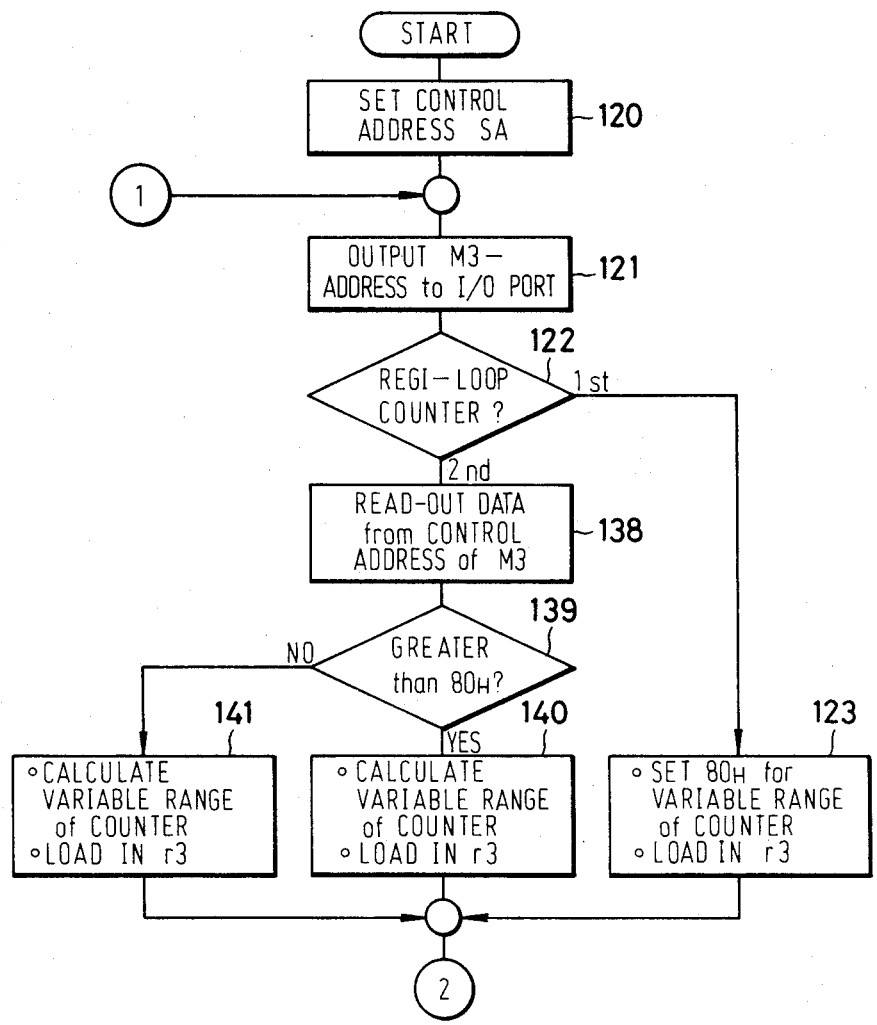
FIGS. 10A, 10B and 10C, taken together, are a flowchart showing details of a data I/O subroutine shown in FIG. 9.
Figure 10B:
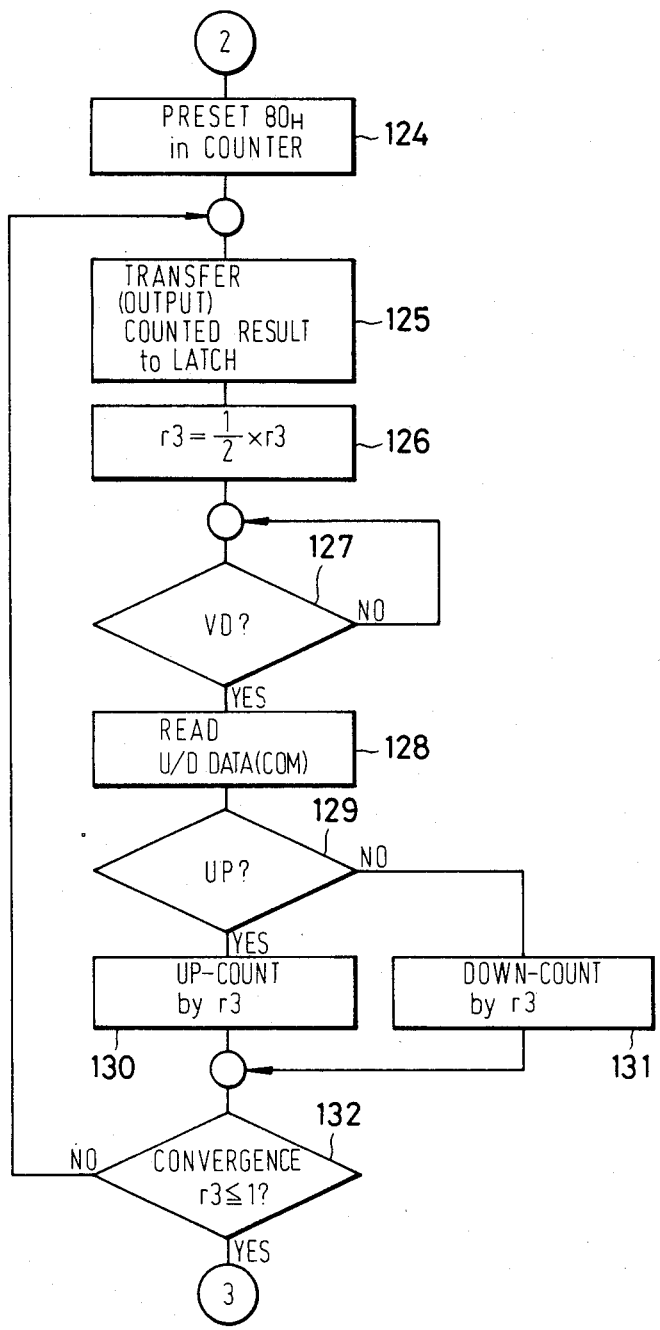
Figure 10C:
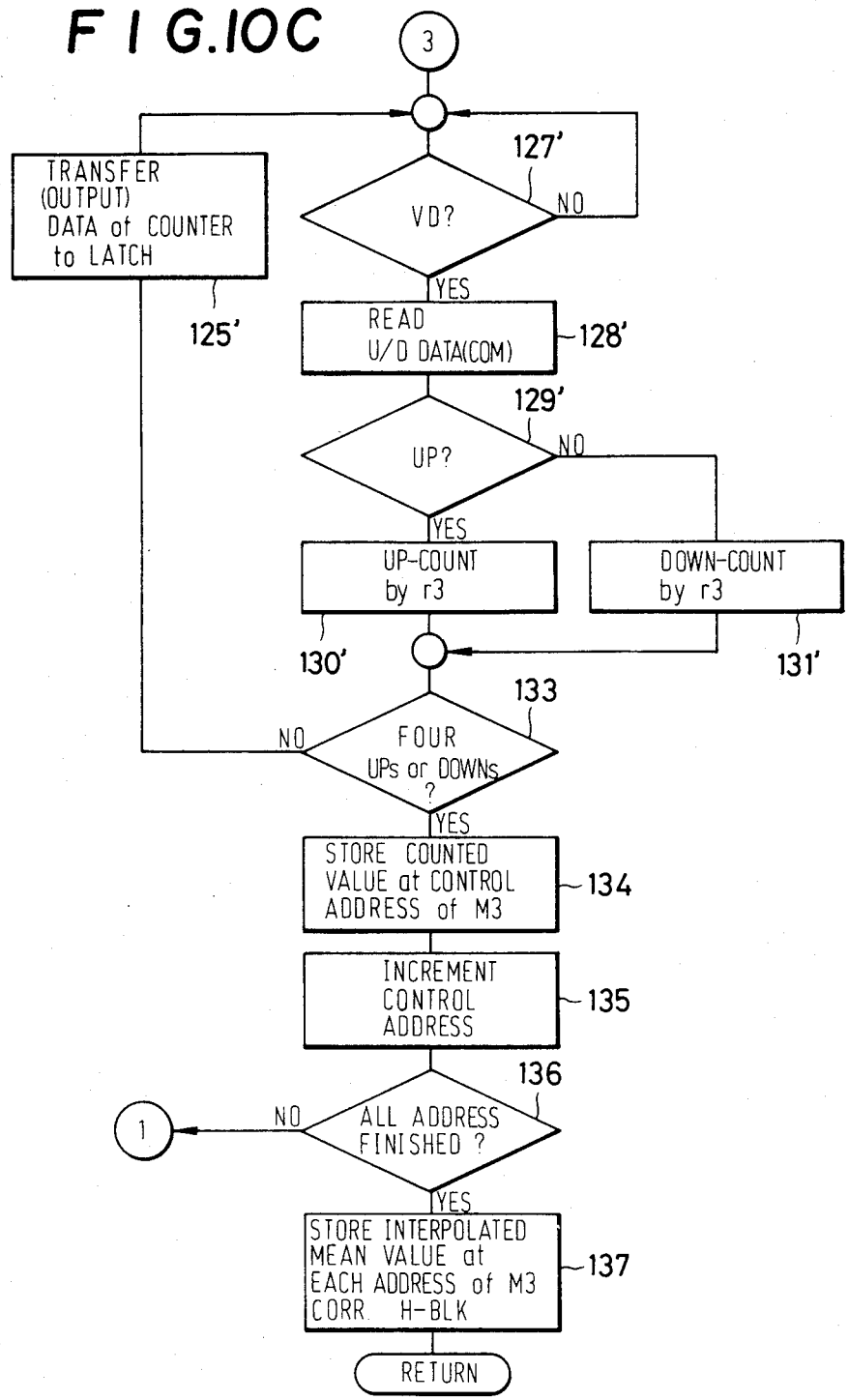

Referring now to FIGS. 10A, 10B and 10C which together show a flowchart of the data I/O subroutine 107 in the flowchart of FIG. 9, it will be seen that, in step 120, a control address SA of RAM M3 is set to correspond to a selected one of the segmented image areas shown in FIG. 1. In step 121, the control address SA thus set is supplied to I/O port 41 (FIG. 8B) and thence to a gate pulse generator 42 (FIG. 8A). In response to the control address SA and an address generated by address generator 56 synchronous with the scanning of the electron beam in the respective image pick-up tube, gate pulse generator 42 generates a gate pulse GE representing the position on the screen of the segmented image area identified by control address SA. In response to this gate pulse GE, the horizontal error data is detected, by the detection circuit shown in FIG. 5, for the segmented image area represented by control address SA.

In step 122 in the flowchart shown in FIG. 10A, the count value of the REGI loop counter is discriminated. If the count value is "1", data 80H (hexadecimal notation) is loaded in a register r3 in CPU 34 in step 123 so as to set the variable range (dynamic range) of the counter in the CPU 34 to the preset value 80H. In step 124 (FIG. 10B), the count value of the counter in CPU 34 is preset to 80H, as shown in FIG. 11, and the amount of correction of the beam deflection of the image pick-up tube involved in the current compensation operation is zero. The dynamic range g of the single up-counting/down-counting operation of the counter is 80H. In step 125, the count value of the counter is transferred from CPU 34 (FIG. 8B) to latch circuit 36 through data bus 35. The output signal from latch circuit 36 is D/A converted and is applied as a correction current to the respective beam deflector. In order to facilitate convergence of the data to the target, the count value of the counter in CPU 34 is not varied in units of 1-bit, as in the case described above, but rather is varied by one-half of the variable range for rapid searching of the error data.

Therefore, in step 126, data representing the dynamic range of the counter of CPU 34, and which is stored in register r3, is reduced to one-half the original value, that is, to 80H/2. In step 127, it is decided if the vertical sync signal VD is supplied to CPU 34. If the decision of step 127 is YES, in step 128, the comparison signal COM from comparator 26, constituting up/down data U/D representing the direction of error, is loaded in CPU 34 through I/O port 41. This up/down data U/D is discriminated in step 129. If the up/down data U/D is UP, the count value of the counter in CPU 34 is up-counted by the dynamic range r3 (=80H/2) in step 130. On the other hand, if the data U/D is DOWN, the count value of the counter is down-counted by r3 (=80H/2) in step 131.

In step 132, it is decided if the reduced dynamic range r3 of the counter has reached 1 bit. If the result of decision step 132 is NO, the flow returns to step 125 to transfer the count value of the counter to latch circuit 36. As a result, a correction amount (+r3/2 or +80H/2) corresponding to the up-counted value of the counter is supplied to the beam deflector, as shown in FIG. 11. Thereafter, the dynamic range r3 of the counter is again divided in half, for example, to (r3/4 or 80H/4), and the count value of the counter is up- or down-counted by that amount in accordance with the detected data. This up-counting/down-counting loop of the U/D counter is repeated until the successively reduced dynamic range r3 becomes 1 bit. Thus, the count value output from the counter converges to a target S by the successive changes +r3/2, +r3/4, −r3/8, −r3/16, and so on at every vertical sync signal VD, as shown in FIG. 11.

After r3 is reduced to 1 bit, the dynamic range of the counter is kept at that value. When reduction of r3 to 1 bit is discriminated in step 132, data processing is performed in the order shown on FIG. 10C to comprise detection of vertical sync signal VD supplied to CPU 34 (step 127'), loading in CPU 34 of the up/down data U/D representing direction of error (step 128'), discrimination of up/down data (step 129'), up-counting or down-counting of the count value of the counter by r3 (step 130' or 131'). In step 133, it is decided if up- or down-counting or U/D operation has been repeated four times as shown in FIG. 11. If NO, the count value is transferred to the latch circuit 36 (step 125'). If it is decided in step 133 that the U/D operation has been repeated four times, so that it may be judged therefrom, that the error data has converged to the target value, then, in step 134, the count value of the counter in CPU 34 is stored in the corresponding address of RAM M3. This completes the first registration compensation operation for one of the segmented image areas shown in FIG. 1. Next, in step 135, the control address of RAM M3 is incremented by one, and registration compensation for the next segmented image area is performed if it is decided, in step 136, that the first registration compensation for all segmented image areas has not been completed. The loop of ① to ① shown in FIG. 10C and FIG. 10A is repeated until registration compensation is completed for all the segmented image areas.

When it is decided, in step 136, that the first registration compensation operation for all the 49 segmented image areas shown in FIG. 1 has been completed and the error data has been written in all the corresponding addresses of RAM M3, then, in step 137 (FIG. 10C), mean value data obtained by interpolation is written at each address of RAM M3 corresponding to the horizontal blanking interval H-BLK shown in FIG. 2. This completes the first data I/O subroutine 107, and the flow returns to the main program of the flowchart shown in FIG. 9. In the main program, the interpolating subroutine 108 is performed, and the interpolated data is stored in RAM M2. In accordance with the readout data from RAM M2, the beam deflector of the respective image pick-up tube is controlled for performing registration compensation.

When the first registration compensation operation is performed, the count value of the REGI loop counter is up-counted by one. Then, as seen from the flowchart of the main program on FIG. 9, the flow returns to the data I/O subroutine 107, and a second registration compensation operation is then performed. In the second registration compensation operation, the count value of two in the REGI loop counter is discriminated in step 122 and the flow jumps to step 138 from step 122 as shown in FIG. 10A. In step 138, the first error data, that is, the error data obtained in the first registration compensation operation, is read out from the control address of RAM M3 by CPU 34. In step 139, the sign or polarity of the error data is discriminated by deciding whether the error data is greater or smaller than the reference data of 80H. If the sign discriminated in step 139 is positive, that is, the error data is greater than 80H, then, in step 140, the error data $S_1$ (FIG. 11) is subtracted from $FF_H$ (all "1" in hexadecimal notation) and the subtraction result is written in register r3 as a variable dynamic range r3'. On the other hand, if the sign discriminated in step 139 is negative, the error data itself is written in register r3 in step 141 as the variable dynamic range r3'.

Subsequent data processing is performed in the same manner as in above described first registration compensation operation. Thus, the up-counting/down-counting operation of the counter is performed from 80H in increments of $+r3'/2$, $-r3'/r$, $+r3'/8$, and so on, as shown in FIG. 11. Since most of the registration error is compensated for by the first registration compensation operation, and since the target S of the counter is smaller, the dynamic range of the counter may be relatively small in the second registration compensation operation.

Figure 12:
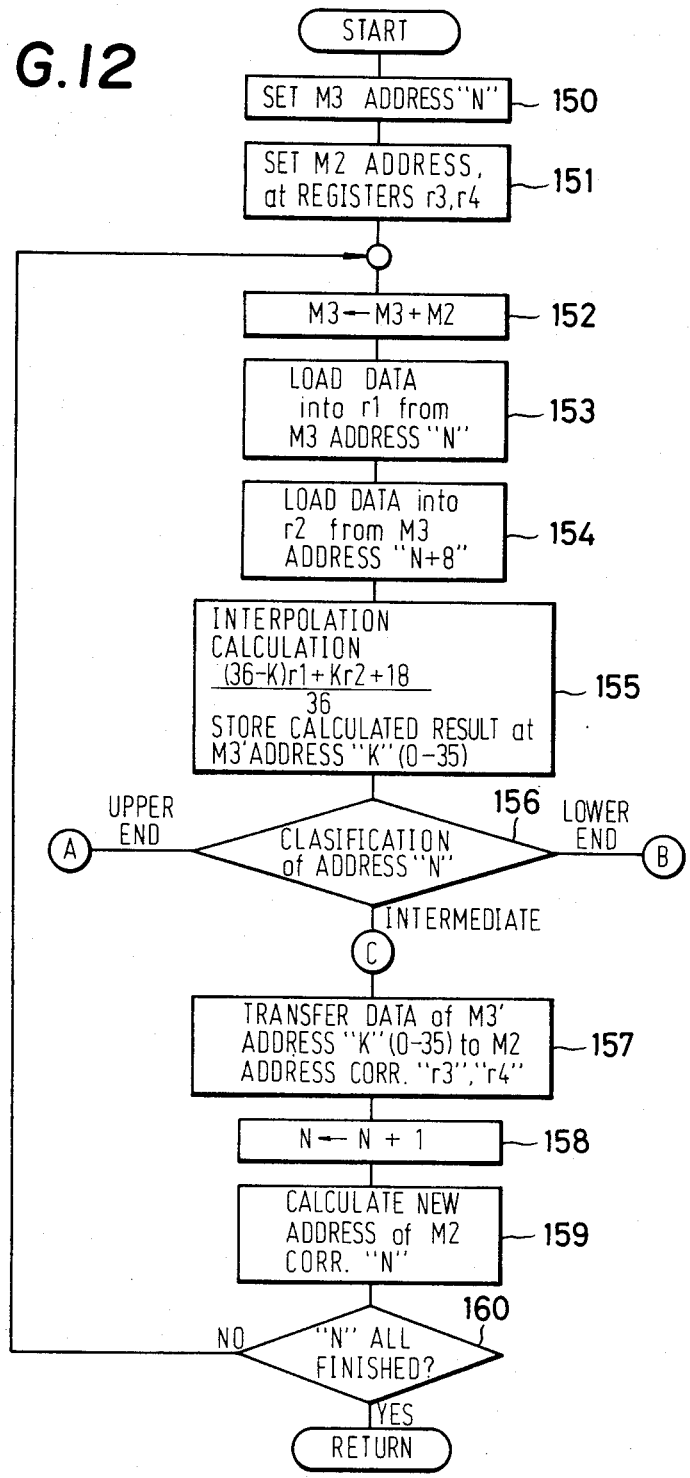
FIG. 12 is a flowchart showing details of an interpolating subroutine shown in FIG. 9.

When the second registration compensation operation is completed by the up-counting/down-counting of the counter and the second error data is written in all the addresses of RAM M3, the flow returns to the main program of the flowchart shown in FIG. 9 and the data is interpolated in the vertical direction in accordance with the program for the interpolating subroutine 108 shown on FIG. 12.

More particularly, as shown in FIG. 12, the address N (0 to 55) of RAM M3 shown in FIG. 2 is set in step 150. Then, in step 151, the address of RAM M2 is set at registers r3 and r4 to correspond with the address N. Although RAM M3 is shown on FIG. 2 to be a one-dimensional memory having addresses 0 to 55, RAM M2 is shown on FIG. 4 to be a two-dimensional memory extending in both the vertical and horizontal directions. In step 152, data stored at each address of RAM M2 corresponding to an address of RAM M3 is read out and added to corresponding error data in RAM M3. In the case of the first registration compensation operation, data 80H is preset or stored in RAM M2. At the commencement of the second registration compensation operation, interpolated data obtained from the first error data detected in the preceding registration compensation operation is stored in RAM M2, the detected second error data is stored in RAM M3. In step 152, new error data is obtained from the addition of M3+M2 and is stored in RAM M3.

In step 153, data stored at the address N of RAM M3 is loaded in register r1, and, in step 154, data stored at the address (N+8) of RAM M3 is loaded in a register r2 of CPU 34. Data at addresses N and (N+8) are adjacent to each other in the vertical direction on the image area shown in FIG. 2. In step 155, interpolated data I1, I2, and so on dividing the difference between the data stored in registers r1 and r2, respectively, into 36 pieces or increments are calculated by linear approximation. The result of such calculation is temporarily stored at a virtual area M3' having K addresses (0 to 35) of RAM M3. The interpolation expression is:

$$[(36-K)r1 + Kr2 + 18]/36$$

Figure 13:
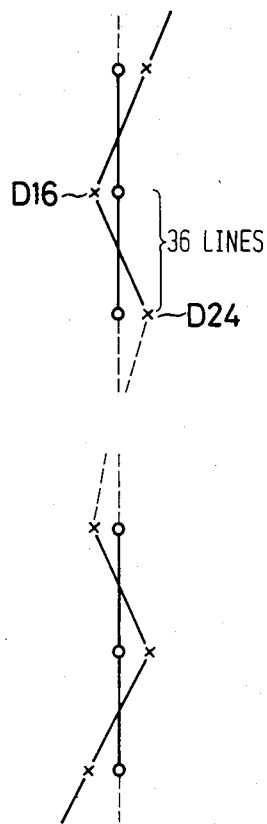
FIG. 13 is a graph showing vertical data, and to which reference will be made in explaining the interpolation process.

The value of K is varied from 0 to 35, and the calculation result is stored in the corresponding address of the area M3'. As a consequence, and as shown in FIG. 13, data are calculated corresponding to 35 scanning lines, respectively, between a pair of vertically adjacent data, for example, D16 and D24.

In decision step 156, addresses N (0 to 55) are classified into upper end addresses (0 to 7), intermediate addresses (8 to 47), and lower end addresses (48 to 55). In the cases of the upper and lower end addresses, the flow branches to A and B, respectively, for the performance of expanding interpolation, as hereinafter described. In the case of the intermediate addresses, the flow branches to C from which, in step 157, the interpolated data stored at address K (0 to 35) of the area M3' is transferred to an address of RAM M2 which is designated by registers r3 and r4. In step 158, the address N of RAM M3 is incremented by one. In step 159, the address of RAM M2 corresponding to the incremented address "N"=(N+1) is calculated. In order to perform the next interpolation, the flow returns to step 152 through step 160. When the address N of RAM M3 advances to 55 and interpolation is completed for most of the data corresponding to the segmented image areas, this state is discriminated in step 160 and the flow returns to the main program shown in FIG. 9.

Figure 14:
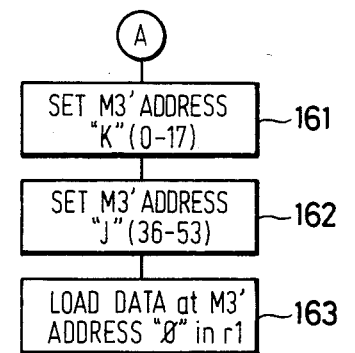
FIG. 14 is a flowchart of an expanding interpolation at the upper end of the image area.

Referring now to FIG. 14 which is a flowchart of expanding interpolation for the upper end of the image area performed in the branch A from step 156 in FIG. 12, it will be seen that, in step 161, address K (0 to 17) of the area M3' is set as a working memory incorporated in RAM M3. In step 162, an address J (36 to 53) of the area M3' is set. The interpolated data calculated in the direction from the upper end (K=0) toward the interior of the image area on step 155 on FIG. 12 is written in address K (0 to 17) of area M3'. The address J of the area M3' stores the data which has been subjected to the expanding interpolation.

Figure 15:
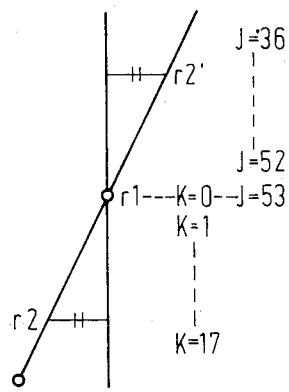
FIG. 15 is a graph showing expanding interpolation at the lower end of the image area.

In step 163, the address 0 (K=0) of the area M3' is loaded in register r1 of CPU 34. Data at address 0 corresponds to the data of the upper end parts 0, 1, 2, ... of the segmented image areas. In step 164, the address K of the area M3' is loaded in register r2 of CPU 34. When expanding interpolation is performed by linear approximation, as indicated in the graph of FIG. 15, interpolated data of the register r2 and new data r2' obtained by the expanding interpolation are point-symmetrical about data of the register r1 at the upper end. Since r2−r1=r1−r2', the extended interpolated data may be obtained by the expression r2'=r1×2−r2. In step 165, the result obtained by this expression is again written in register r2. In step 166, an overflow of the calculation result is discriminated. If no overflow is discriminated, the result of the calculation in step 165 is transferred to the address J of area M3' in step 168. The address J of the area M3' is address 52 if the data of the register r2 is 1. On the other hand, if an overflow is discriminated, the contents of register r2 are reset to $FF_H$ (all "1" in hexadecimal notation) or to $00_H$ (all "0") in step 167.

When one interpolation process is completed, the address J is decremented by one, that is, to (J−1), in step 169. In step 170, the address K is incremented by one to (K+1). The interpolation process is repeated 18 times until the address J is 36. When it is discriminated in step 171 that J=32, the extended interpolation data at the address J (36 to 53) of the area M3' is transferred to the corresponding address I of RAM M2 in step 172. When one expanding interpolation process for one piece of data at the upper end of the image area is completed, the flow returns to branch C in FIG. 12.

Figure 16:
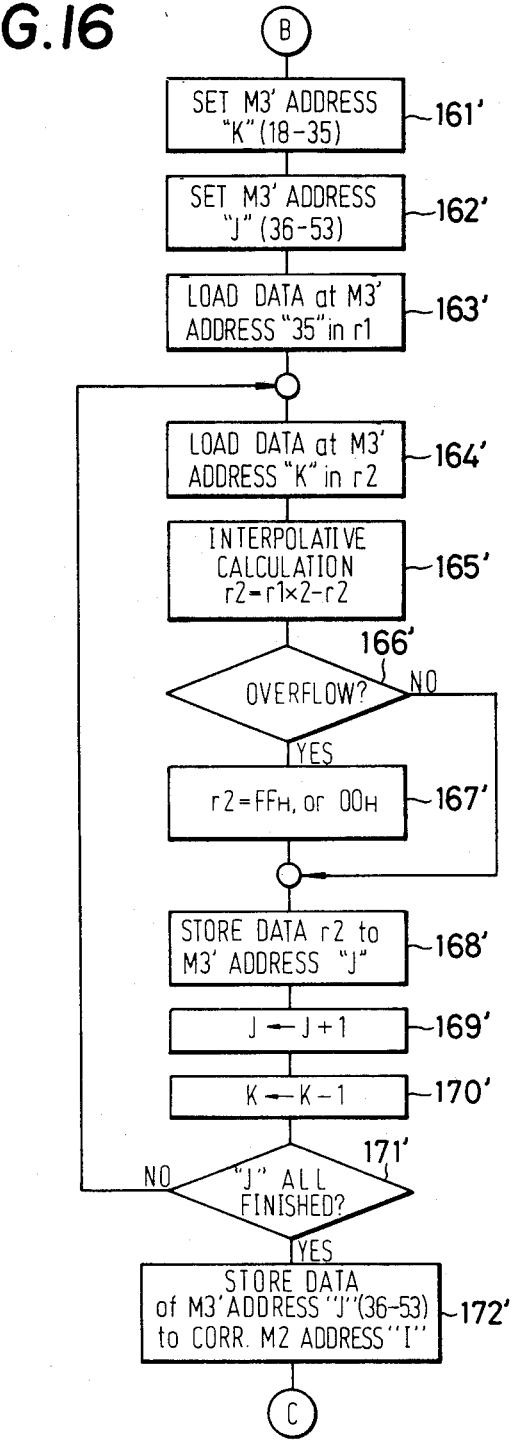
FIG. 16 is a flowchart of an expanding interpolation at the lower end of the image area.

Referring now to FIG. 16, it will be seen that the flowchart of the expanding interpolation for the lower end of the image area performed in the branch B of step 156 on FIG. 12, is generally the same as that shown in FIG. 14 and differs therefrom primarily in that the extended interpolated data below the data at the lower end of the image area is calculated on the basis of the data at the address K (18 to 53) of the area M3' obtained by upward interpolation from the data at the lower end of the image area by step 155 on FIG. 12.

In this manner, the interpolated data is calculated for all the memory areas (256×8) shown in FIG. 4, and the calculation result is transferred to the corresponding one of the RAMs M1 to M1''' from RAM M2 as has been described with reference to FIG. 9. In accordance with the NTSC system, the number of scanning lines in one field is 262.5. When the image area is vertically divided into seven segmented image areas, as on FIG. 1, and 36 lines are assigned to each segmented image area, 6×36, that is, 216, interpolated data pieces are obtained at the intermediate portion of the field and 18 extended interpolated data pieces are obtained for each of the upper and lower ends of the image area. Therefore, the vertical addresses of each of the RAMs M2 and M1 to M1''' must number 36×7+1=253 for including an address necessary for storing the data of the vertical blanking interval V-BLK. In this manner, a memory of 2 kbyte capacity can store data corresponding to one channel. In order to achieve correspondence between the vertical addresses of the memory and the scanning lines, 36×7 addresses are allocated for 36×7 scanning lines and the remaining single address is allocated for 11 scanning lines as the vertical blanking interval. Thus, the addresses of the memory are allocated for each of scanning lines numbering 36×7+11=263.

At one vertical address of the RAM corresponding to 11 scanning lines of the vertical blanking interval, there is stored the mean value between the data at the uppermost end obtained by the expanding interpolation at the upper end of the image area and the data at the lowermost end obtained by the expanding interpolation at the lower end. This mean value data is read out repeatedly during scanning of the 11 lines constituting the blanking interval. The blanking interval (11 lines) for addressing RAMs M1 to M1''' and M2 is made shorter than that for the actual video signal. Since scanning is performed over a wide range including the blanking interval of the image within the image pick-up tube, compensation precision may thus be improved at the periphery of the image area by performing registration compensation even within the vertical blanking interval. A portion of the memory area shown surrounded by a solid line u in FIG. 4 corresponds to an effective image area for the NTSC system.

When the present invention is applied to the PAL television system, error data necessary for registration compensation is extracted in the same manner as described above. By modifying the correspondence between the vertical addresses of the RAMs M1 to M1''' and M2 and the scanning lines, hardware and software may be used in common for NTSC and PAL systems. Since the number of scanning lines per field is 312.5 in the PAL system, the image area is divided vertically into seven segmented image areas, and forty-two lines are assigned to each segmented image area. If the vertical blanking interval is made to correspond to 15 lines, the required number of scanning lines is 42×7+15=309. Therefore, four additional scanning lines are required for the 312.5 scanning lines of one field, and interpolated data may be obtained for these four additional scanning lines by performing expanding interpolation downward at the lowermost segmented image area. However, if one address is allocated for one line as in the case of the NTSC system, the required number of addresses is 42×7+1+4=299, and the data for one channel cannot be stored in a memory with a capacity of 2 kbytes. An increase in the memory capacity is not desirable from the viewpoints of cost and power consumption.

For this reason, in an embodiment of the present invention for use with the PAL system, 36 addresses are allocated for 42 lines. Incrementing of the address is stopped once in every six steps to achieve correspondence between the number of error data pieces and the number of lines. By reason of this processing system, in terms of the memory space, the effective image area for the PAL system, as indicated by dotted lines v on FIG. 4, becomes substantially the same as the effective image area for the NTSC system indicated by the solid line u.

The address generator 56 which generates an address of the RAMs M1 to M1''' from which the error data is to be read out in synchronism with the scanning operation of the image pick-up tube will now be described with reference to FIG. 17. As there shown, a horizontal sync signal HD (FIG. 18B) used in the television camera is supplied to an H-phase adjust circuit 62 to be phase-adjusted therein, as shown in FIG. 18C, and is then supplied to a PLL circuit 63. Since the gate pulse GE is generated by gate pulse generator 42 in accordance with an address generated by address generator 56, H-phase adjust circuit 62 serves to adjust the phase of the horizontal sync signal HD so that the effective image area is symmetrical in respect to gate pulse GE.

From the output of PLL circuit 63, clock pulses 16FH (FIG. 18F) are obtained by frequency multiplication so as to have a frequency that is sixteen times the horizontal frequency. The clock pulses 16FH are supplied to the clock input CK of a 4-bit H-counter 64. A carry output FH at the horizontal frequency (FIG. 18E) is divided from H-counter 64 and is passed through an inverter 64 to provide an inverted signal $\overline{FH}$ (FIG. 18D) which is fed back to PLL circuit 63 as a phase comparison signal. A clock pulse 8FH (FIG. 18G) of a frequency eight times the horizontal frequency is obtained from the least significant bit of H-counter 64. This clock pulse 8FH is used as a clock for generating an address which is required for reading out horizontal error data from the RAM. The upper three significant bits VMA0, VMA1 and VMA2 of H-counter 64 are used to define the horizontal address of the vertical error data. This address changes from 0 to 7 within the horizontal scanning interval, as shown in FIG. 18H.

A V-phase adjust circuit 66 is also incorporated in address generator 56 for the same purpose as H-phase adjust circuit 62. The V-phase adjust circuit 66 receives the vertical sync signal VD (FIG. 19B) used in the television camera and produces therefrom a V timing signal VD1 shown in FIG. 19D. This V timing signal VD1 is supplied, as a preset signal, to a V blanking (V-BLK) counter 67 which sets a V blanking interval V-BLK (FIG. 19A) of the reading address. A V timing signal VD2 (FIG. 19E) is also provided by V-phase adjust circuit 66 and is supplied, as a set signal, to a flip-flop 68 for generating a V-blanking signal BLK (FIG. 19H). This flip-flop 68 is incorporated for controlling V-counters 69a and 69b as hereinafter described in detail.

As shown on FIG. 19F, the V-BLK counter 67 is preset to a count value "4" by V timing signal VD1 (FIG. 19D). This preset value is determined by preset data PS supplied to counter 67 and a signal of high level which is obtained from an NTSC/PAL change-over switch 70. The count value of V-BLK counter 67 is up-counted upon reception, at an enable input PE, of each clock pulse FH (horizontal scanning frequency) supplied from H-counter 64 through a buffer 71. When the count value reaches "15", counter 67 generates a carry pulse "15CA", as shown in FIG. 19G. V-BLK counter 67 further receives, at a clock input CLK thereof, the clock pulses 16FH (FIG. 18F) which are applied through a buffer 72 from PLL circuit 63.

Since the carry pulse 15CA (FIG. 19G) from V-BLK counter 67 is supplied to flip-flop 68 as a clear pulse, the V-blanking signal BLK (FIG. 19H) obtained from the Q output of flip-flop 68 in synchronism with the clock pulse FH has a pulse width of 11H. This blanking pulse signal BLK is supplied to inputs CLR of both V-counters 69a and 69b as a clear pulse. Therefore, V-counters 69a and 69b up-count at every horizontal scanning interval after the blanking pulse signal BLK shown in FIG. 19H returns to its high level. Both V-counters 69a and 69b are of 4-bit configuration and are series-connected with each other. Although the clock pulse 16FH supplied to V-counters 69a and 69b has a frequency sixteen times the horizontal frequency, the counters generate count values of 0 to 256 which are up-counted in synchronism with the horizontal scanning interval since the clock pulse FH of the horizontal or line frequency is supplied to the enable input TE of V-counter 69a. These count values 0 to 256 signified by the 8 bits VMA3 to VMA10 are used as the vertical addresses of the memory area shown in FIG. 4 for reading out the vertical error data from the respective memory. More particularly, the horizontal address bits VMA0–VMA2 from H-counter 64 and the vertical address bits VMA3–VMA10 from V-counters 69a and 69b are applied to RAMs M1 and M1'' (FIG. 8A) for reading out therefrom the vertical error data for the red tube 3 and the blue tube 2.

The bits VMA0–VMA5 and the bits VMA6–VMA10 are also supplied to latch circuits 75a and 75b, respectively, which also receive the clock 8FH (FIG. 18G) from H-counter 64. The latch circuits 75a and 75b each comprise eleven D flip-flops and are operative to provide addresses for reading out the horizontal error data, which addresses change at the leading edge of the clock 8FH and are defined by horizontal address bits HMA0–HMA2 and vertical address bits HMA3–HMA10 respectively corresponding to the bits VMA0–VMS2 and the bits VMA3–VMA10. As shown on FIGS. 18H and 18I in respect to the horizontal address bits VMA0–VMA2 for the vertical error data and the horizontal address bits HMA0–HMA2 for the horizontal error data, respectively, the up-counting of the addresses defined by bits HMA0 to HMA10 for reading out the horizontal error data is delayed by one-half the period of the clock 8FH in respect to up-counting of the addresses defined by bits VMA0 to VMA10 for reading out the vertical error data. The horizontal address bits HMA0–HMA2 and the vertical address bits HMA3–HMA10 are applied from latch circuits 75a and 75b to RAMs M1' and M1''' (FIG. 8A) for reading out therefrom the horizontal error data for the red tube 3 and the blue tube 2.

The vertical error data read out of RAMs M1 and M1'' and the horizontal error data read out of RAMs M1' and M1''' are D/A converted in converters 40a and 40c and in converters 40b and 40d, respectively, before being applied to the vertical and horizontal deflection coils of deflectors 23 and 22 of the red and blue image pick-up tubes 3 and 2 through suitable low pass filter means (not shown). The delay or time constant of such low pass filter means is selected to compensate for the phase difference, corresponding to one-half the period of the clock 8FH, between the read-out of the vertical error data from RAMs M1 and M1" and the read-out of the horizontal error data from RAMs M1' and M1'".

Referring now to FIG. 18J which shows a part ("0" and "6") of the gate pulse GE generated by gate pulse generator 42 on the basis of the addresses VMA or HMA and the control address SA representing the segmented image areas 0, 1, 2,—and so on, in FIG. 2, it will be seen that the gate pulse GE trails the addresses VMA and HMA in consideration of the delay due to the above mentioned low-pass filter means.

A television camera according to this embodiment of the present invention will now be described as applied to the PAL system. FIG. 19J shows the vertical blanking interval of a PAL signal. As has been mentioned earlier, when the present invention is applied to the PAL system, an interval of 15H in the blanking interval is assigned for the blanking interval during the read-out of data from the memory. When change-over switch 70 (FIG. 17) is engaged with its fixed contact PAL a preset signal of low level is provided to change the preset data of V-BLK counter 67. As a result, V-BLK counter 67 is preset to a count value "0" as shown in FIG. 19K in response to the V timing signal VD1 (FIG. 19D), and counter 67 is then up-counted to "15" at the horizontal scanning frequency.

The Q output from flip-flop 68 goes low during the 15H time interval from the V timing signal VD2 to the carry output 15CA from V-BLK counter 67. During this 15H time interval, V-counters 69a and 69b are cleared to interrupt their counting operations. When flip-flop 68 is reset by carry output 15CA, the cleared status of V-counters 69a and 69b is released and they begin to count from 1 to 255, as shown in FIG. 19L.

The low level signal from change-over switch 70 is also supplied through an inverter 76 to the enable input TE of a 6/7 counter 77 of 4-bit configuration. This counter 77 receives the clock pulse 16FH as a clock CLK and clock pulse FH as a count enable input (PE) so that counter 77 operates at the horizontal scanning frequency. Counter 77 is supplied with "9" as the preset data PS so that, as shown in FIG. 19M, counter 77 counts from "10" to "15" after the blanking interval of 15H, and generates the carry output CA when the count value reaches "15". The carry output CA from counter 77 is fed back to the clear input CLR through an inverter 78 and a negative logic OR gate 79. Therefore, as shown in FIG. 19H, in response to the clock pulse FH after clearing counter 77 is preset to "9". In this manner, counter 77 operates as a septenary counter.

Since the carry output CA from counter 77 is inverted by inverter 78 and is supplied to the enable input PE of V-counter 69a, V-counter 69a stops its counting operation when the count value thereof reaches "15". The output from the inverter 78 is also supplied to an input of an AND gate 80 which receives clock pulse FH at another input for transmission to an enable input PE of V-counter 69b. Therefore, the supplying of clock pulse FH to the enable input PE of V-counter 69b is disabled, so that V-counter 69b stops its counting operation, when the count value thereof reaches "15". As a result, as shown in FIG. 19L, the up-counting operation of V-counters 69a and 69b is interrupted once in every 7H. Thus, the vertical addresses VMA3 to VMA10 are generated so that the same address is generated twice or repeated after every six addresses, for example, as in 5, 6, 6, 7, 8, 9, 10, 11, 12, 12, 13, and so on.

When the present invention is applied to the PAL system, the contents of the RAMs M1 to M1'" are read out in such a manner that, after every six lines, the next line is read out together with the data of the immediately preceding line. In this manner, 42 scanning lines are allocated for 32 vertical addresses of the RAMs M1 to M1'". As shown in FIG. 4, the effective image area of the PAL system may be covered by RAMs of the same capacity (256×8) as the RAMs used for the NTSC system.

As earlier noted, the addresses VMA0 to VMA10 for reading out the vertical error data generated by the address generator 56 shown in FIG. 17 are supplied to RAMs M1 (R/V) and M1" (B/V), while the addresses HMA0 to HMA10 for reading out the horizontal error data are supplied to RAMs M1' (R/H) and M1'" (B/H). Thus, the error data is read out in synchronism with the scanning operation. The vertical error data thus read out of RAMs M1 and M1", after passing through D/A converters 40a and 40c (FIG. 8A) and the previously mentioned low-pass filter means (not shown), are applied as registration compensation signals R/V-ERROR and B/V-ERROR to terminals 81a and 81c (FIG. 20) of the vertical deflecting system of the television camera embodying this invention.

Figure 20:
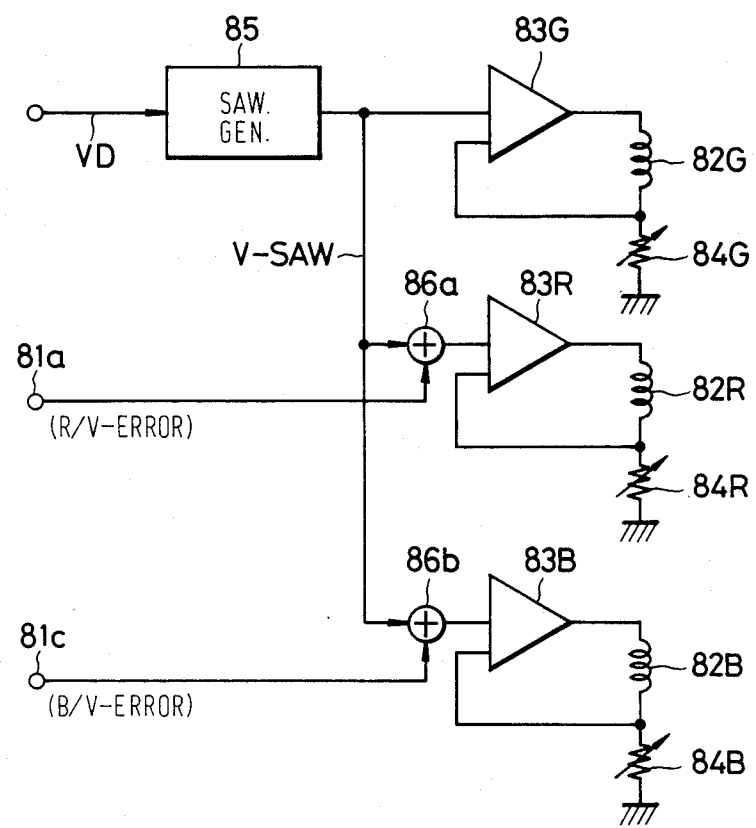
FIG. 20 is a block diagram of a vertical deflecting system of a multi-tube color television camera to which the invention is desirably applied.

As shown in FIG. 20, the vertical deflecting system has vertical deflecting coils 82G, 82R and 82B for green tube 4, red tube 3 and blue tube 2, respectively, and such coils are driven by A- or B-class amplifiers 83G, 83R and 83B, respectively. Variable resistors 84G, 84R and 84B are connected in series with the respective vertical deflecting coils 82G, 82R and 82B. The terminal voltages at resistors 84G, 84R and 84B are fed back to differential inputs of amplifiers 83G, 83R and 83B, respectively, so that currents proportional to the input voltages divided by the resistances of resistors 84G, 84R and 84B flow to the respective vertical deflecting coils. Amplifier 83G for driving coil 82G of the green tube is supplied with a vertical scanning sawtooth wave signal V-SAW which is generated in synchronism with the vertical sync signal VD by a sawtooth wave generator 85. Amplifiers 83R and 83B for driving coils 82R and 82B for the red and green tubes are supplied with the same sawtooth wave signal through adders 86a and 86b, respectively.

Registration compensation signals R/V-ERROR and B/V-ERROR are supplied to adders 86a and 86b from terminals 81a and 81c, respectively, for performing the vertical registration compensation for the red and blue tubes. Although the vertical deflecting coils 82G, 82R, and 82B have frequency characteristics, and high-frequency components of the registration compensation signal for the vertical errors have frequencies which are several times the horizontal scanning frequency and thus may be degraded, this is compensated for by the repeated compensation which has been described above.

Figure 21:
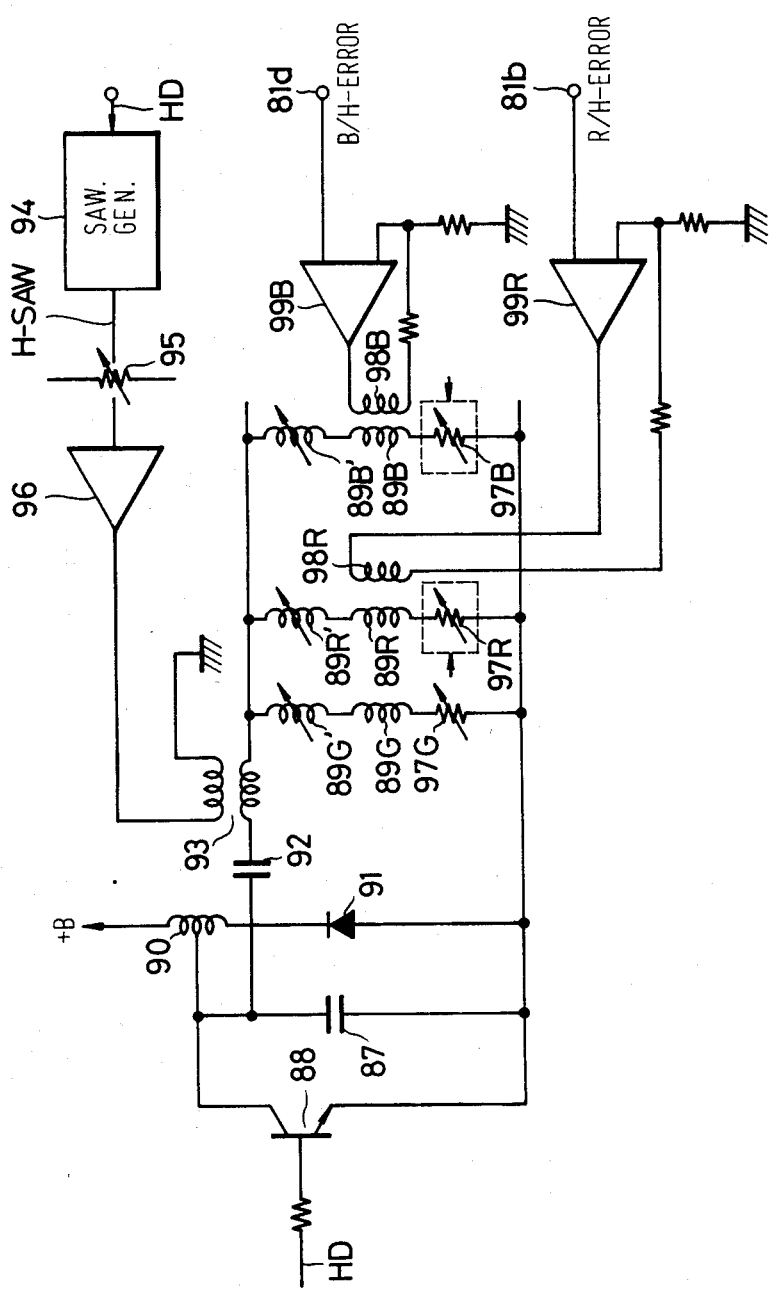
FIG. 21 is a block diagram of a horizontal deflecting system of the multi-tube color television camera.

In the horizontal deflecting system shown in FIG. 21, terminals 81b and 81d receive registration compensation signals R/H-ERROR and B/H-ERROR, respectively, which result from the passage of the horizontal error data read out of RAMs M1' and M1" through D/A converters 40b and 40d and through suitable low-pass filter means. A transistor 88 is driven by the horizontal sync signal HD to cause the flow of sawtooth wave currents of horizontal scanning frequency through horizontal deflecting coils 89G, 89R and 89B for the green, red and blue tubes. A capacitor 87 is connected in parallel with transistor 88 for integration, and a diode 91 is connected in parallel with transistor 88 through a flyback transformer 90 for damping purposes. The secondary winding of a compensating transformer 93 is connected in series with a capacitor 92 in the line through which the deflecting current is applied to each of horizontal deflecting coils 89G, 89R and 89B. A sawtooth wave signal H-SAW of horizontal scanning frequency is generated in synchronism with the horizontal sync signal HD by a sawtooth wave generator 94 and is supplied to the primary winding of compensating transformer 93 through a gain controller 95 and an amplifier 96. Thus, a compensation for achieving the linearity of the horizontal deflection is performed.

The horizontal deflecting coils 89G, 89R and 89B are shown on FIG. 20 to have parts 89G', 89R' and 89B' which are adjustable for controlling their inductances, so that coarse variation of the size of the output image from each image pick-up tube may be effected. Variable resistors 97G, 97R and 97B are inserted in series with horizontal deflecting coils 89G, 89R and 89B, respectively. By control of these variable resistors 97G, 97R and 97B, the central position of the output image of each image pick-up tube may be aligned with the others. The variable resistors 97R and 97B for the red and blue tubes may be replaced by a variable impedance circuit. In such case, the central positions of the output images from the red and blue tubes may be aligned relative to the central position of the output image from the green tube under the control of an automatic centering circuit as referred to hereinbefore.

The horizontal registration compensation for red tube 3 and blue tube 2 may be achieved by the flow of a compensating current through auxiliary coils 98R and 98B which are in the form of secondary windings in respect to the main horizontal deflecting coils 89R and 89B, respectively. These auxiliary coils 98R and 98B are driven by amplifiers 99R and 99B which receive the error siganls corresponding to horizontal error data for the red and blue channels read out from RAMs M1' and M1'''. By the incorporation of these coils 98R and 98B, the main deflecting coils 89R and 89B may be driven by a switching operation, and A-class or B-class amplifiers need not be used for this purpose, so that lower power consumption may be achieved. Since the coarse compensation as to the linearity, image size and central position for each image pick-up tube may be performed by the deflecting currents which flow through the main deflecting coils, the amount of error to be compensated for by the auxiliary coils 98R and 98B may be relatively reduced. Therefore, the output capacities of amplifiers 99R and 99B may be relatively small.

Since the ends of main horizontal deflecting coils 89R and 89B are short-circuited by switching driver circuits in the horizontal scanning interval, the energy supplied to auxiliary coils 98R and 98B leaks to the driver circuit of lower impedance, and adversely affects the magnetic fluxes of the auxiliary coils. In particular, high-frequency components of the magnetic fluxes of the auxiliary coils are attenuated by the integration. However, by performing the second and subsequent registration compensation operations, as has been described above, an error signal which has been compensated for this attenuation may be obtained and the problem of attenuation of the high-frequency components may thus be solved. Auxiliary coils similar to the coils 98R and 98B in FIG. 21 may be incorporated as well in the vertical deflecting system of FIG. 20.

In the embodiments of the invention described above, interpolation of the vertical direction of error data for each scanning line is performed by linear approximation. However, such interpolation may be performed by an interpolation of the second or third degree. Furthermore, interpolation in the horizontal direction may also be performed in the embodiments described above, although the memory area may have to be enlarged for this. Since the registration error is generally increased as the periphery of the screen is approaches, the image area shown on FIG. 1 may be divided into finer or smaller segmented image areas near the periphery of the screen for improving the precision of the compensation. The number of segmented image areas is preferably an odd number, such as $7 \times 7 = 49$, as in the embodiments described above. When the image area is divided into an odd number of segmented image areas, a segmented image area is formed precisely at the center of the screen. Therefore, if a dc bias is applied to the main deflecting coils in advance of registration compensation for achieving centering of the pick-up tube images, then the amount of error to be compensated for by the auxiliary coils may be reduced.

In summary, it will be seen that, according to the present invention, the effective image area is divided into a plurality of segmented image areas (for example, $7 \times 7$), a registration error of the output signal from each image pick-up tube (the red tube or the blue tube) with reference to the output signal from a reference image pick-up tube (the green tube) is detected and stored in a first memory (M3), the contents of the first memory are interpolated and the resulting data is stored in a memory area ($256 \times 8$) of a second memory (M2) which is expanded in the direction corresponding to the vertical direction of the screen, and error signals corresponding to the data read out from the second memory are supplied to the beam deflecting control means for the red and blue image pick-up tube.

In the above, registration error data from a relatively small number of sampling operations may be detected within a relatively short period of time and with a relatively small number of segmented image areas. Since the data is interpolated to provide data corresponding to the horizontal scanning lines, relatively precise registration compensation can be effected.

Although a number of preferred embodiments of the invention have been described in detail herein with reference to the accompanying drawings, it is to be understood that the invention is not limited to those precise embodiments, and that various changes and modifications may be effected therein by one skilled in the art without deparing from the scope and spirit of the invention as defined in the appended claims.

What is claimed is:

1. A multi-tube color television camera with an automatic registration adjusting system comprising:
    a first image pick-up tube for deriving a first video signal corresponding to an image of a test chart for registration adjustment;
    a second image pick-up tube for deriving a second video signal corresponding to said image of said test chart and having a deflection control circuit;
    error sampling means for sampling registration errors between said first and second video signals at portions thereof corresponding to an array of segmented areas of said image;
    interpolated registration error generating means for generating interpolated registration errors at portions of said video signals intermediate said sampled registration errors in the absence of sampled data at said intermediate portions by interpolating between the sampled registration errors at least in the vertical direction of said array of segmented image areas;

means for generating registration compensating signals based on said interpolated and sampled registration errors; and means for supplying said registration compensating signals to said deflection control circuit of said second image pick-up tube for correcting registration errors of the latter in respect to said first image pick-up tube.

2. A multi-tube color television camera with an automatic registration adjusting system according to claim 1; wherein said deflection control circuit of the second image pick-up tube includes a main deflection coil and an auxiliary deflection coil, and said registration compensating signals are supplied to said auxiliary deflection coil.

3. A multi-tube color television camera with an automatic registration adjusting system according to claim 1; wherein said means for generating registration compensating signals includes memory means for storing said registration compensating signals, and means for changing the registration compensating signals stored in said memory means on the basis of said sampled registration errors.

4. A multi-tube color television camera with an automatic registration adjusting system according to claim 1; wherein said error sampling means includes counter means which selectively increments and decrements its contents by one-half of the previous counted value in accordance with the detected error polarity in order to determine a final value of the sampled registration error.

5. A multi-tube color television camera with an automatic registration adjusting system according to claim 1; wherein said error sampling means includes memory means having a plurality of addresses respectively corresponding to said segmented image areas.

6. A multi-tube color television camera with an automatic registration adjusting system according to claim 5; wherein said interpolated registration error generating means includes memory means having addresses respectively corresponding to said interpolated registration errors and said sampled registration errors.

7. A multi-tube color television camera with an automatic registration adjusting system according to claim 1; further comprising a third image pick-up tube for deriving a third video signal also corresponding to said image of said test chart and having a respective deflection control circuit; and wherein said error sampling means samples registration errors between said first and third video signals at said portion thereof corresponding to said array to provide other sampled registration errors, said interpolated registration error generating means also interpolates between said other sampled registration errors at least in said vertical direction to provide other interpolated registration errors, said means for generating registration compensating signals includes means generating other registration compensating signals based on said other interpolated and sampled registration errors, and said means for supplying said registration compensating signals includes means for applying said other registration compensating signals to said deflection control circuit of the third image pick-up tube for correcting registration errors of the latter relative to said first image pick-up tube.

8. A multi-tube color television camera with an automatic registration adjusting system according to claim 1; in which said error sampling means samples both horizontal and vertical registration errors between said first and second video signals at said portions, and said interpolated registration error generating means interpolates in the vertical direction between the sampled horizontal registration errors and between the sampled vertical registration errors.

9. A multi-tube color television camera with an automatic registration adjusting system according to claim 1; in which said interpolated registration error generating means includes means for interpolating upwardly and downwardly from said sampled registration errors at said portions of the video signals which correspond to the top and bottom, respectively, of said array of segmented image areas.

10. A multi-tube color television camera with an automatic registration adjusting system according to claim 9; in which said interpolated registration error generating means includes memory means having addresses therein respectively corresponding to said sampled registration errors and to said interpolated registration errors interpolated between and from said sampled registration errors.

11. A multi-tube color television camera with an automatic registration adjusting system according to claim 10; in which said sampled registration errors and said interpolated registration errors interpolated between and from said sampled registration errors correspond to all horizontal lines of a field of said video signal, and said memory means has an address corresponding to each of said horizontal lines.

12. A multi-tube color television camera with an automatic registration adjusting system according to claim 10; further comprising change-over means having first and second states for selectively adapted said registration adjusting system for NTSC and PAL signals, respectively, said change-over means including addressing means by which, in said first state, said sampled registration errors and said interpolated registration errors interpolated between and from said sampled registration errors are made to correspond to all horizontal lines of a field of said signals and are all temporarily stored at respective addresses of said memory means, and, in said second state, said interpolated registration errors corresponding to adjacent horizontal lines at intervals between said sampled registration errors are stored at the same addresses of said memory means.

13. A multi-tube color television camera with an automatic registration adjusting system according to claim 1; in which each of said first and second image pick-up tubes includes horizontal and vertical deflection means for causing scanning of the respective image along a vertical succession of horizontal lines; and in which said error sampling means includes means for causing said sampling of registration errors at spaced apart locations along selected ones of said horizontal lines which are spaced apart in said vertical succession thereof.

14. A multi-tube color television camera with an automatic registration adjusting system according to claim 13; in which said error sampling means includes memory means having addresses respectively corresponding to said spaced apart locations along said selected horizontal lines for temporary storage of the corresponding registration errors and additional addresses at which there are temporarily stored mean values of the sampled registration errors at the beginning and end of each of said selected horizontal lines for determining said registration compensation signals during horizontal blanking intervals.

15. A multi-tube color television camera with an automatic registration adjusting system according to claim 13; in which said error sampling means includes means for selectively sampling horizontal and vertical registration errors between said first and second video signals at said portions thereof; and said means for generating registration compensating signals includes memory means for storing horizontal and vertical registration compensating signals, respectively, based on the sampled horizontal and vertical registration errors and on the interpolated registration errors interpolated in the vertical direction from said sampled horizontal and vertical registration errors, respectively.

16. A multi-tube color television camera with an automatic registration adjusting system according to claim 15; in which said horizontal deflection means of said second image pick-up tube includes a main deflection coil and an auxiliary deflection coil, means for applying a saw-tooth signal to said main deflection coil for causing horizontal scanning in said second image pick-up tube, and means for applying to said auxiliary deflection coil the horizontal registration compensating signals read out of the respective memory means in synchronism with said scanning.

17. A multi-tube color television camera with an automatic registration adjusting system according to claim 16; in which said vertical deflection means of said second image pick-up tube includes a vertical deflection coil, means for applying a second saw-tooth signal to said vertical deflection coil for causing vertical scanning in said second image pick-up tube, and means for adding to said second saw-tooth signal the vertical registration compensating signals read out of the respective memory means in synchronism with said scanning.

18. A multi-tube color television camera with an automatic registration adjusting system according to claim 1; in which said error sampling means includes control means for effecting a predetermined number of successive operating cycles thereof; said means for generating registration compensating signals includes memory means for storing said registration compensating signals, and means for changing said registration compensating signals stored in said memory means in response to changes in the sampled registration errors during said successive operating cycles of said error sampling means; and said means for supplying said registration compensating signals to said deflection control circuit includes means reading out said stored registration compensating signals from said memory means in synchronism with each of said successive operating cycles of said error sampling means.

19. A multi-tube color television camera with an automatic registration adjusting system according to claim 18; in which said error sampling means separately samples horizontal and vertical registration errors between said first and second video signals at said portions, said memory means includes memories for respectively storing horizontal and vertical registration compensating signals based on said sampled horizontal and vertical registration errors and the respective interpolated registration errors, and in which said number of operating cycles is greater when sampling said horizontal registration errors and generating the respective registration compensating signals than when said vertical registration errors are being sampled.

20. A multi-tube color television camera with an automatic registration adjusting system according to claim 19; in which said interpolated registration error generating means interpolates in the vertical direction between the sampled horizontal registration errors and between the sampled vertical registration errors.

21. A multi-tube color television camera with an automatic registration adjusting system according to claim 20; in which said error sampling means includes counter means which selectively increments and decrements its contents by one-half of the previous counted value in accordance with the polarity of the detected error in order to determine a final value of the sampled registration error.

* * * * *